(12) United States Patent
Cwiertny et al.

(10) Patent No.: US 11,136,453 B2
(45) Date of Patent: Oct. 5, 2021

(54) ELECTROSPUN NANOFIBER COMPOSITES FOR WATER TREATMENT APPLICATIONS

(71) Applicants: THE REGENTS OF THE UNIVERSITY OF CALIFORNIA, Oakland, CA (US); UNIVERSITY OF IOWA RESEARCH FOUNDATION, Iowa City, IA (US)

(72) Inventors: David Michael Cwiertny, Iowa City, IA (US); Nosang Vincent Myung, Riverside, CA (US); Katherine Tanya Peter, Iowa City, IA (US); Katherine Elizabeth Greenstein, Iowa City, IA (US); Gene Francis Parkin, Iowa City, IA (US)

(73) Assignees: THE REGENTS OF THE UNIVERSITY OF CALIFORNIA, Oakland, CA (US); UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 211 days.

(21) Appl. No.: 16/303,807

(22) PCT Filed: May 26, 2017

(86) PCT No.: PCT/US2017/034663
§ 371 (c)(1),
(2) Date: Nov. 21, 2018

(87) PCT Pub. No.: WO2017/205732
PCT Pub. Date: Nov. 30, 2017

(65) Prior Publication Data
US 2020/0317903 A1    Oct. 8, 2020

Related U.S. Application Data

(60) Provisional application No. 62/341,753, filed on May 26, 2016.

(51) Int. Cl.
*C08L 33/20* (2006.01)
*B01D 39/16* (2006.01)
(Continued)

(52) U.S. Cl.
CPC .......... *C08L 33/20* (2013.01); *B01D 39/1623* (2013.01); *B01D 39/2079* (2013.01);
(Continued)

(58) Field of Classification Search
CPC . C08L 33/20; B01D 39/1623; B01D 39/2079; B01D 2239/025;
(Continued)

(56) References Cited

U.S. PATENT DOCUMENTS 3,826,369 A    7/1974   Murata et al.
3,950,507 A    4/1976   Boreskov et al.
(Continued)

FOREIGN PATENT DOCUMENTS

WO    2011/140304 A1    11/2011

OTHER PUBLICATIONS

Ganesh, Tissue Engineering: Part A, vol. 18, Nos. 17 and 18, 2012, p. 1867-1881 (Year: 2012).*
(Continued)

*Primary Examiner* — Robert C Boyle
(74) *Attorney, Agent, or Firm* — Viksnins Harris Padys Malen LLP

(57) ABSTRACT

Composites comprising polymeric nanofibers, metal oxide nanoparticles, and optional surface-segregating surfactants and precursor compositions are disclosed. Also disclosed are nonwoven mats formed from the composites and methods of making and using the composites. The composites enable the deployment of nanostructured materials for water treat-
(Continued)

ment within a self-contained membrane with high water fluxes, as well as a number uses.

10 Claims, 11 Drawing Sheets

(51) Int. Cl.
| | |
|---|---|
| *B01D 39/20* | (2006.01) |
| *C08K 3/22* | (2006.01) |
| *D04H 1/4242* | (2012.01) |
| *D04H 1/43* | (2012.01) |
| *C08K 3/04* | (2006.01) |
| *B82Y 30/00* | (2011.01) |
| *B82Y 40/00* | (2011.01) |
| *C08K 5/19* | (2006.01) |

(52) U.S. Cl.
CPC ............. *C08K 3/22* (2013.01); *D04H 1/4242* (2013.01); *D04H 1/43* (2013.01); *B01D 2239/025* (2013.01); *B01D 2239/0631* (2013.01); *B82Y 30/00* (2013.01); *B82Y 40/00* (2013.01); *C08K 3/041* (2017.05); *C08K 5/19* (2013.01); *C08K 2003/2227* (2013.01); *C08K 2003/2268* (2013.01); *C08K 2003/2272* (2013.01)

(58) Field of Classification Search
CPC .......... B01D 2239/0631; B01D 69/148; B01D 69/12; B01D 67/0004; B01D 2323/39; C08K 3/22; C08K 3/041; C08K 2003/2272; C08K 2003/2268; C08K 2003/2227; C08K 5/19; D04H 1/4242; D04H 1/43; D04H 1/728; B82Y 30/00; B82Y 40/00
See application file for complete search history.

(56) References Cited

U.S. PATENT DOCUMENTS

| | | | |
|---|---|---|---|
| 4,231,768 A | 11/1980 | Seibert et al. | |
| 6,706,795 B1 | 3/2004 | Garti et al. | |
| 8,714,776 B2 * | 5/2014 | Han | D04H 3/02 |
| | | | 362/257 |
| 2006/0264140 A1 | 11/2006 | Andrady et al. | |
| 2010/0009267 A1 | 1/2010 | Chase et al. | |
| 2010/0035047 A1 | 2/2010 | Ajayan et al. | |
| 2011/0031441 A1 | 2/2011 | Hsu et al. | |
| 2011/0052467 A1 | 3/2011 | Chase et al. | |
| 2012/0132644 A1 | 5/2012 | Gu et al. | |
| 2013/0175026 A1 | 7/2013 | Chakraborty et al. | |
| 2015/0056471 A1 * | 2/2015 | Joo | C04B 35/6224 |
| | | | 428/687 |

OTHER PUBLICATIONS

"Iowa Statewide Rural Well Water Survey Phase 2", (SWRL2) Results and Analysis, Aug. 2009, pp. 1-27, Center for Health Effects of Environmental Contamination, The University of Iowa.
Brass et al. "Much Effort and Resources Needed to Help Small Drinking Water Systems Overcome Challenges", Evaluation Report, Report No. 2006-P-00026, May 30, 2006, pp. 1-55, U.S. Environmental Protection Agency, Office of Inspector General.
Peter et al., "Synthesis, Optimization, and Performance Demonstration of Electrospun Carbon Nanofiber-Carbon Nanotube Composite Sorbents for Point-of-Use Water Treatment", ACS Applied Materials & Interfaces, 2016, pp. 11431-11440, vol. 8, American Chemical Society.
Ramakrishna et al., "Electrospun Nanofibers: Solving Global Issues" MaterialsToday, Mar. 2006, pp. 40-50, vol. 9, No. 3, Elsevier Ltd.
Zhang et al., "Stability of Commercial Metal Oxide Nanoparticles in Water", Water Research, 2008, pp. 2204-2212, vol. 42, Elsevier Ltd.
Keller et al., "Stability and Aggregation of Metal Oxide Nanoparticles in Natural Aqueous Matrices", Environmental Science & Technology, 2010, pp. 1962-1967, vol. 44, No. 6, American Chemical Society.
Mohan et al., Arsenic Removal from Water/Wastewater Using Adsorbents—A Critical Review, Journal of Hazardous Materials, 2007, pp. 1-53, vol. 142, Elsevier B.V.
Dickenson et al., "Applying Surrogates and Indicators to Assess Removal Efficiency of Trace Organic Chemicals during Chemical Oxidation of Wastewaters", Environmental Science & Technology, 2009, pp. 6242-6247, vol. 43, No. 16, American Chemical Society.
Westerhoff et al., "Fate of Endocrine-Disruptor, Pharmaceutical, and Personal Care Product Chemicals during Simulated Drinking Water Treatment Processes", Environmental Science & Technology, 2005, pp. 6649-6663, vol. 39, No. 17, American Chemical Society.
Oulton et al., "Phamaceuticals and Personal Care Products in Effluent Matrices: A Survey of Transformation and Removal during Wastewater Treatment and Implications for Wastewater Management", Journal of Environmental Monitoring, 2010, pp. 1956-1978, The Royal Society of Chemistry.
Friedmann et al., "TiO2 for Water Treatment: Parameters Affecting the Kinetics and Mechanisms of Photocatalysis", Applied Catalysis B: Environmental, 2010, pp. 398-406, vol. 99, Elsevier B.V.
Gong et al., "Lack of Influence of Extracellular Polymeric Substances (EPS) Level on Hydroxyl Radical Mediated Disinfection of *Escherichia coli*", Environmental Science & Technology, 2012, pp. 241-249, vol. 46, American Chemical Society.
Pettibone et al., Adsorption of Organic Acids on TiO2 Nansoparticles: Effects of pH, Nanoparticle Size, and Vanoparticle Aggregation, Langmuir, 2008, pp. 6659-6667, vol. 24, American Chemical Society.
Larese-Casanova et al., "Nanogoethite Formation from Oxidation of Fe(II) Sorbed on Aluminum Oxide: Implications for Contaminant Reduction", Environmental Science & Technology, 2010, pp. 3765-3771, vol. 44, No. 10, American Chemical Society.
Xie et al., "Use of Dithionite to Extend the Reactive Lifetime of Nanoscale Zero-Valent Iron Treatment Systems", Environmental Science & Technology, 2010, pp. 8649-8655, vol. 44, No. 22, American Chemical Society.
Cwiertny et al., "Surface Chemistry and Dissolution of $\alpha$-FeOOH Nanorods and Microrods: Environmental Implications of Size-Dependent interactions with Oxalate", J. Phys. Chem. C, 2009, pp. 2175-2186, vol. 113, American Chemical Society.
Cwiertny et al., "Interpreting Nanoscale Size-effects in Aggregated Fe-oxide Suspensions: Reaction of Fe(II) with Goethite", Geochimica et Cosmochimica Acta, 2009, pp. 1365-1380, vol. 72, Elsevier Ltd.
Cwiertny et al., "Exploring the Influence of Granular Iron Additives on 1,1,1-Trichloroethane Reduction", Environmental Science & Technology, 2006, pp. 6837-6843, vol. 40, No. 21, American Chemical Society.
Cwiertny et al., "Characterization and Acid-mobilization Study of Iron-containing Mineral Dust Source Materials", Journal of Geophysical Research, 2008, pp. 1-18, vol. 113, The American Geophysical Union.
Ohno et al., "Synergism Between Rutile and Anatase TiO2 Particles in Photocatalytic Oxidation of Naphthalene", Applied Catalysis A: General, 2003, p. 383-391, vol. 244, Elsevier Science B.V.
Lei et al., "Highly Active Mixed-phase TiO2 Photocatalysts Fabricated at Low Temperature and the Correlation Between Phase Composition and Photocatalytic Activity", Journal of Environmental Sciences C, 2008, pp. 1263-1267, vol. 20.
Tachikawa et al., "Mechanistic Insight into the TiO2 Photocatalytic Reactions: Design of New Photocatalysts", The Journal of Physical Chemistry, Apr. 12, 2007, pp. 5260-5275, vol. 111, No. 14, American Chemical Society.
Lee et al., "Synthesis and Characterization of TiO2 Nanowires with Controlled Porosity and Microstructure Using Electrospinning Method", Current Applied Physics, 2011, pp. S210-S214, vol. 11, Elsevier B.V.

(56) References Cited

OTHER PUBLICATIONS

Liang et al., "Removal of Arsenate from Water by Using the Synthetical Iron-Aluminum Hydroxide Complexes", Acta Scientiae Circumstantiae, 2006, pp. 1, Oriprobe Information Services, Inc.
Li et al., "Enhanced Arsenite Adsorption onto Litchi-like Al-doped Iron Oxides", J. Am. Ceram. Soc., 2011, pp. 584-591, vol. 94, No. 2, The American Ceramic Society.
Papadimitriou et al., "Determination of Photo-Catalytic Activity of Un-doped and Mn-doped TiO2 Anatase Powders on Acetaldehyde Under UV and Visible Light", Thin Solids Films, 2011, pp. 1195-1201, vol. 520, Elsevier B.V.
Cacho et al., "Studies on Photo-induced NO Removal by Mn-doped TiO2 Under Indoor-like Illumination Conditions", Journal of Photochemistry and Photobiology A: Chemistry, 2011, pp. 304-306, vol. 222, Elsevier B.V.
Shao, "Red Shift in Manganese- and Iron-Doped TiO2: A DFT+U Analysis", J. Phys. Chem. C, 2009, pp. 6800-6808, vol. 113, American Chemical Society.
Bjorge et al., "Performance Assessment of Electrospun Nanofibers for Filter Applications", Desalination, 2009, pp. 942-948, vol. 249, Elsevier B.V.
Botes et al., "The Potential of Nanofibers and Nanobiocides in Water Purification", Critical Reviews in Microbiology, Jan. 20, 2010, pp. 68-81, vol. 36, No. 1, Informa UK Ltd.
Daels et al., "The Use of Electrospun Flat Sheet Nanofibre Membranes in MBR Applications", Desalination, 2010, pp. 170-176, vol. 257, Elsevier B.V.
Homaeigohar et al., "Ployethersulfone Electrospun Nanofibrous Composite Membrane for Liquid Filtration", Journal of Membrane Science, 2010, pp. 68-77, vol. 365, Elsevier B.V.
Bjorge et al., "Initial Testing of Electrospun Nanofibre Filters in Water Filtration Applications", Short Communication, Jan. 1, 2010, pp. 151-156, vol. 36, No. 1.
Ramakrishna et al., "Science and Engineering of Electrospun Nanofibers for Advances in Clean Energy, Water Filtration, and Regenerative Medicine", J. Mater. Sci., 2010, pp. 6283-6312, vol. 45, Springer Science+Business Media, LLC.
Thavasi et al., "Electrospun Nanofibers in Energy and Environmental Applications", Energy & Environmental Science, 2008, pp. 205-221, vol. 1, The Royal Society of Chemistry.
Dai et al., "Ceramic Nanofibers Fabricated by Electrospinning and their Applications in Catalysis, Environmental Science, and Energy Technology", Polymers Advanced Technologies, 2011, pp. 326-338, vol. 22, John Wiley & Sons, Ltd.
Masciangioli et al., "Environmental Technologies and the Nanoscale", Environmental Science & Technology, Mar. 1, 2003, pp. 102-108, American Chemical Society.
Wiesner et al., "Assessing the Risks of Manufactured Nanomaterials", Environmental Science & Technology, Jul. 15, 2006, pp. 4337-4345, American Chemical Society.
The Initiative and its Implementation Plan, National Nanotechnology Initiative, Jul. 2000, pp. 1-144, National Science and Technology Council Committee on Technology Subcommittee on Nansoscale Science, Engineering and Technology, Washington, D.C.
"Chromium-6 in U.S. Tap Water", Dec. 20, 2010, pp. 1-3, Environmental Working Group.
Donn et al., "An AP Investigation: Pharmaceuticals Found in Drinking Water", Mar. 10, 2008, pp. 1-7, Associated Press.
Savage et al., "Nanotechnology Applications for Clean Water", Library of Congress Cataloging-in-Publication Data, ISBN: 978-0-8155-1578-4, 2009, pp. 1, William Andrew Inc.
Sustich et al., "Introduction: Water Purification in the Twenty-First Century—Challenges and Opportunities", Nanotechnology Applications for Clean Water, 2009, pp. xxxi-xl, William Andrew Inc.
Duncan et al., "Introduction to Societal Issues: The Responsible Development of Nanotechnology for Water", Societal Issues, Nanotechnology Applications for Clean Water, 2009, pp. 449-451, William Andrew Inc.

International Search Report (PCT/ISA/210) dated Aug. 21, 2017, by the ISA/US, Commissioner for Patents as the International Searching Authority for International Application No. PCT/US2017/034663.
Written Opinion (PCT/ISA/237) dated Aug. 21, 2017, by the ISA/US, Commissioner for Patents as the International Searching Authority for International Application No. PCT/US2017/034663.
Campos et al., "Removal of Chromate from Drinking Water Using Powder Carbon Steel", Environ. Geol., Feb. 2, 2015, pp. 926-930, vol. 47, Springer-Verlag.
Martin et al., "Surface Interactions of Arsenite and Arsenate on Soil Colloids", Soil Science Society of America Journal, Jan. 30, 2014, pp. 157-170, vol. 78, Soil Science Society of America.
Osseo-Asare et al., "Adsorption Phenomena in Hydrometallurgy, 1 the Uptake of Copper, Nickel and Cobalt by Oxide Adsorbents in Aqueous Ammoniacal Solutions", International Journal of Mineral Processing, Mar. 15, 1979, pp. 85-104, vol. 6, Elsevier Scientific Publishing Company, Amsterdam.
Lenhart et al., Reactions at the Solid/Solution Interface: Fe-Oxides and Hydroxides—Uranium(VI) Sorption to Hematite in the Presence of Humic Acid, Geochimica et Cosmochimica Acta, Apr. 29, 1999, pp. 2891-2901, vol. 63, No. 19/20, Elsevier Science Ltd.
Li et al., "Effect of Phosphate on the Adsorption of Cu and Cd on Natural Hematite", Chemosphere, 2006, pp. 1235-1241, vol. 63, Elsevier Ltd.
Rose et al., "Adsorption of Cu, Pb, Zn, Co, Ni, and Ag on Geothite and Hematite: A Control on Metal Mobilization from Red Beds into Stratiform Copper Deposits", Economic Geology, pp. 1226, 1236, vol. 88, No. 1993.
Perera et al., "An Investigation of the Lead(II)-Hydroxide System", Inorganic Chemistry, Jun. 23, 2001, pp. 3974-3978, vol. 40, American Chemical Society.
Shock, "Response of Lead Solubility to Dissolved Carbonate in Drinking Water", American Water Works Association, Dec. 1980, pp. 695-704, vol. 72, No. 12, Wiley.
Cuppett et al., "Evaluation of Copper Speciation and Water Quality Factors that Affect Aqueous Copper Tasting Response", Chem. Senses, Jul. 13, 2006, pp. 689-697, vol. 31, Oxford University Press.
Hering et al., "Arsenic Removal from Drinking Water during Coagulation", Journal of Environmental Engineering, Aug. 1997, pp. 800-807, vol. 123, No. 8.
Schwarzenbach et al., "The Challenge of Micropollutants in Aquatic Systems", Science, Aug. 25, 2006, pp. 1072-1077, vol. 313, No. 5790, American Association for the Advancement of Science.
Leonnig, "CDC Misled District Residents about Lead Levels in Water, House Probe Finds", Washington Post, May 20, 2010, pp. 1-2, The Washington Post Company.
Cwiertny et al., "Research and Demonstration of Electrospun Nanofibers Filters: Multifunctional, Chemically Active Filtration Technologies for Small-Scale Water Treatment Systems", Project Overview, Dec. 1, 2011-Nov. 30, 2016, pp. 1-4.
Nalbandian et al., "Synthesis and Optimization of BiVO4 and Co-Catalyzed BiVO4 Nanofibers for Visible Light-Activated Photocatalytic Degradation of Aquatic Micropollutants", Journal of Molecular Catalysis A: Chemical, 2015, pp. 18-26, vol. 404-405, Elsevier B.V.
Nalbandian et al., "Synthesis and Optimization of Ag-TiO2 Composite Nanofibers for Photocatalytic Treatment of Impaired Water Sources", Journal of Hazardous Materials, 2015, pp. 141-148, vol. 229, Elsevier B.V.
Nalbandian et al., "Synthesis and Optimization of Fe2O3 Nanofibers for Chromate Adsorption from Contaminated Water Sources", Chemosphere, 2016, pp. 975-981, vol. 144, Elsevier Ltd.
Nalbandian et al., "Tailored Synthesis of Photoactive TiO2 Nanofibers and Au/TiO2 Nanofiber Composites: Structure and Reactivity Optimization for Water Treatment Applications", Environmental Science & Technology, 2015, pp. 1654-1663, vol. 49, American Chemical Society.
Greenstein et al., "Development of Polymer-Iron Oxide Hybrid Nanofiber Networks for Metal Sequestration in Point-of-use Water Treatment Applications", Civil and Environmental Engineering, Dec. 2016, pp. 1-15, University of Iowa.

(56) References Cited

OTHER PUBLICATIONS

Gimenez et al., "Arsenic Sorption onto Natural Hematite, Magnetite, and Goethite", Journal of Hazardous Materials, 2007, pp. 575-580, vol. 141, Elsevier B.V.
Mamindy-Pajany et al., "Arsenic Adsorption onto Hematite and Goethite", C. R. Chime, 2009, pp. 876-881, vol. 12, Academie des sciences, Elsevier Masson SAS.
Barton et al., "Size-Dependent Pb Sorption to Nanohematite in the Presence and Absence of a Microbial Siderophore", Environmental Science and Technology, 2011, pp. 3231-3237, vol. 45, American Chemical Society.
Shipley et al., "Removal of Pb(II), Cd(II), Cu(II), and Zn(II) by Hematite Nanoparticles: Effect of Sorbent Concentration, pH, Temperature, and Exhaustion", Environ. Sci. Pollut. Res., 2013, pp. 1727-1736, vol. 20, Springer-Verlag.
Ajouyed et al., "Sorption of Cr(VI) onto Natural Iron and Aluminum (oxy) Hydroxides: Effects of pH, Ionic Strength and Initial Concentration" Journal of Hazardous Materials, 2010, pp. 616-622, vol. 174, Elsevier B.V.
Singh et al., "Adsorption Technique for the Treatment of As(V)-Rich Effluents", Colloids and Surfaces A: Physiochemical and Engineering Aspects, 1996, pp. 49-56, vol. 111, Elsevier Science B.V.
Chen et al., "Arsenic Removal by Tailored Activated Carbon at Ambient pH", Water Research Foundation and Arsenic Water Technology Partnership, 2009, pp. 1-66, WERC, A Consortium for Environmental Education and Technology Development at New Mexico State University.
Lakshmipathiraj et al., "Adsorption of Arsenate on Synthetic Goethite from Aqueous Solutions", Journal of Hazardous Materials, 2006, pp. 281-287, vol. B136, Elsevier B.V.
Bora et al., "Hydrothermal Treatment of a Hematite Film Leads to Highly Oriented Faceted Nanostructures with Enhanced Photocurrents", Chemistry of Materials, Apr. 1, 2011, pp. 2051-2061, vol. 23, American Chemical Society.
Shuibo et al., "Removal of Uranium (VI) from Aqueous Solution by Adsorption of Hematite", Journal of Environmental Radioactivity, 2009, pp. 162-166, vol. 100, Elsevier Ltd.
Davis et al., "Adsorption of Cadmium and Humic Acid onto Hematite", Chemosphere, 1995, pp. 243-256, vol. 30, No. 2, Elsevier Science Ltd., Great Britain.
Jeon et al., "Sorption Kinetics of Fe(II), Zn(II), Co(II), Ni(II), Cd(II), and Fe(II)/Me(II) onto Hematite", Water Research, 2003, pp. 4135-4142, vol. 37, Elsevier Ltd.
Catalano et al., "Simulaneous Inner- and Outer-sphere Arsenate Adsorption on Corundum and Hematite", Geochimica et Cosmochimica Acta, 2008, pp. 1986-2004, vol. 72, Elsevier Ltd.
Yin et al., "DFT Studies of Cr(VI) Complex Adsorption on Hydroxylated Hematite (1102) Surfaces", Surface Science, 2009, pp. 736-746, vol. 603, Elsevier B.V.
Bargar et al., "Surface Complexation of Pb (II) at Oxide-water Interfaces: II. XAFS and Bond-valence Determination of Mononuclear Pb (II) Sorption Products and Surface Functional Groups on Iron Oxides", Geochimica et Cosmochimica Acta, 1997, pp. 2639-2652, vol. 61, No. 13, Elsevier Science Ltd., USA.
Peacock et al., "Copper(II) Sorption onto Goethite, Hematite and Lepidocrocite: A Surface Complexation Model Based on Ab Initio Molecular Geometries and EXAFAS Spectroscopy", Geochimica et Cosmochimica Acta, 2004, pp. 2623-2637, vol. 68, No. 12, Elsevier Ltd.
"A Proven, Safe, and Simple Solution to Arsenic Removal Challenges", GFH Dry Granular Ferric Hydroxide Media, 2018, pp. 1-2, Evoqua Water Technologies LLC.
Kosmulski, "pH-dependent Surface Charging and Points to Zero Charge. IV. Updated and New Approach", Journal of Colloid and Interface Science, 2009, pp. 439-448, vol. 337, Elsevier Inc.
Hua et al., "Heavy Metal Removal from Water/Wasterwater by Nanosized Metal Oxides: A Review", Journal of Hazardous Materials, 2012, pp. 317-331, vol. 211-212, Elsevier B.V.

Genc-Fuhrman et al., "Simultaneous Removal of As, Cd, Cr, Cu, Ni, and Zn from Stormwater: Experimental Comparison of 11 Different Sorbents", Water Research, 2007, pp. 591-602, vol. 41, Elsevier Ltd.
"Arsenic Contamination Exceeds Drinking Water Standards", American Gypsum, 2017, pp. 1-2, Evoqua Water Technologies LLC.
Hanna-Attisha et al., "Elevated Blood Lead Levels in Children Associated with the Flint Drinking Water Crisis: A Spatial Analysis of Risk and Public Health Response", AJPH Research, Feb. 2016, pp. 283-290, vol. 106, No. 2.
Steger-Hartmann et al., "Environmental Risk Assessment for the Widely Used Iodinated X-Ray Contrast Agent Iopromide (Ultravist)" Ecotoxicology and Environmental Safety, Environmental Research, Section B, 1999, pp. 274-281, vol. 42, Academic Press.
Lee et al., "Synthesis of Ultra-long Hollow Chalcogenide Nanofibers", Chem. Commun., 2011, pp. 9107-9109, vol. 47, The Royal Society of Chemistry.
Hong et al., "Electrochemical Synthesis of $Fe_xNi1-x-_x$ Nanostructures for Environmental Remediation", Chemical Engineering Journal, 2009, pp. 66-72, vol. 151, Elsevier B.V.
Biswas et al., "Adsorption of Fluoride from Aqueous Solution by a Synthetic Iron(III)-Aluminum(III) Mixed Oxide", Ind. Eng. Chem. Res., 2007, pp. 5346-5356, vol. 46, American Chemical Society.
Mohapatra et al., Fluoride Adsorption Studies on Mixed-phase Nano Iron Oxides Prepared by Surfactant Mediation-precipitation Technique, Journal of Hazardous Materials, 2011, pp. 1751-1757, vol. 186, Elsevier B.V.
Oulton et al., "Hydroxyl Radical Formation during Ozonation of Multiwalled Carbon Nanotubes: Performance Optimization and Demonstration of a Reactive CNT Filter", Environmental Science and Technology, 2015, pp. 3687-3697, vol. 49, American Chemical Society.
Redding et al., "A QSAR-like Analysis of the Adsorption of Endocrine Disrupting Compounds, Pharmaceuticals, and Personal Care Products on Modified Activated Carbons", Water Research, 2009, pp. 3849-3861, vol. 43, Elsevier Ltd.
"Iowa Quick Facts", https://www.iowa.gov/about, 5 pages (2019).
Benotti, M , et al., "Pharmaceuticals and Endocrine Disrupting Compounds in U.S. Drinking Water", Environ Sci Technol 43, 597-603 (2009).
Cain, T , et al., "Occurrence of Antibiotics, Pharmaceuticals and Sterols at Select Surface and Wastewater Sites in Iowa", in Proceedings of the 4th International conference on pharmaceuticals and endocrine disrupting chemicals in water, Minneapolis, Minn., National Ground Water Association, 151-157, Oct. 13-15, 2004.
Cwiertny, D , et al., "Research and Demonstration of Electrospun Nanofiber Filters: Multifunctional, Chemically Active Filtration Technologies for Small-Scale Water Treatment Systems", EPA Agreement No. 83517701, Civil and Environmental Engineering, University of Iowa, Chemical and Environmental Engineering, University of California Riverside, 23 pages, (Project Period Dec. 1, 2011-Nov. 30, 2016).
Evoqua Water Technologies , "American Gypsum, Albuquerque, New Mexico: Arsenic Contamination Exceeds Drinking Water Standards", Evoqua Water Technologies LLC, 210 Sixth Avenue, Suite 3300, Pittsburgh, PA 15222, 2 pages (2017).
Evoqua Water Technologies , "Bucks County Water Authority, Solebury, Pennsylvania: Arsenic Treatment to Meet New Drinking Water Standards", Evoqua Water Technologies LLC, 210 Sixth Avenue, Suite 3300, Pittsburgh, PA 15222, 2 pages (2017).
Evoqua Water Technologies , "GFH Dry Granular Ferric Hydroxide Media: A Proven, Safe, and Simple Solution to Arsenic Removal Challenges", Evoqua Water Technologies LLC, 210 Sixth Avenue, Suite 3300, Pittsburgh, PA 15222, 2 page (2018).
Evoqua Water Technologies , "Municipal Drinking Water Facility: GFH Media Removes Arsenic in Arizona Water Supply", Evoqua Water Technologies LLC, 4800 North Point Parkway, Suite 250, Alpharetta, GA 30022, 2 pages (2014).
Ramsden, J , "Micro & Nano Technologies", Published by William Andrew Inc., ISBN: 978-0-8155-1578-4, 20 pages (2009).
Roco , et al., "National Nanotechnology Initiative: The Initiative and Its Implementation Plan", National Science and Technology

(56) References Cited

OTHER PUBLICATIONS

Councel Committee on Technology Subcommittee on Nanoscale Science, Engineering and Technology, 1-144 pages (Jul. 2000).
Sutton, R , "Chromium-6 in U.S. Tap Water", Environmental Working Group, https://www.ewg.org/research/chromium6-in-tap-water, 1-24 (Dec. 20, 2010).

* cited by examiner

ELECTROSPUN NANOFIBER COMPOSITES FOR WATER TREATMENT APPLICATIONS

CROSS-REFERENCE TO RELATED APPLICATIONS

This application claims priority to U.S. Provisional Application Ser. No. 62/341,753, filed May 26, 2016, the contents of which is incorporated herein by reference in its entirety.

STATEMENT REGARDING U.S. GOVERNMENT SUPPORT

This invention was made with government support under U.S. EPA Science to Achieve Results (STAR) Grant No. R835177 and NSF Graduate Research Fellowship 1048957. The U.S. government has certain rights in the invention.

FIELD OF THE INVENTION

The invention relates generally to nanofiber composites and more particularly, to chemically-functional nanofiber composites useful for, inter alia, selective separations.

BACKGROUND OF THE INVENTION

Metal pollutants in drinking water remains a problem with occurrence from corrosion (e.g., copper, lead, and the like) and natural and anthropogenic contamination (e.g., arsenic, hexavalent chromium, and the like). Granular activated carbon and granular ferric hydroxide have been used in conventional water treatment, but suffer from having mostly internal reactive surface area, thereby reducing exposure of the reactive surface area to the pollutants that they are meant to remove. In addition, they have relatively large application footprints (e.g., bed filtration). Engineered nanomaterials have been used to increase the reactive surface area of water treatment materials. Despite their great promise, the use of engineered nanomaterials in water treatment is severely limited by practical challenges (e.g., high pressure drops through packed beds of nanoparticles/nanotubes) and concerns over the possible release of engineered nanomaterials, some of which can be toxic, into the environment and treated water supply.

Improving safety and reliability of water supplies require technologies that are deployable across a range of scales ranging from point-of-use applications to integration in conventional treatment. Simultaneously, these technologies must be affordable, robust, and sustainable so that they can also be of value to small water systems (i.e., systems that serve 10,000 people or less). The invention is directed to these, as well as other, important needs.

SUMMARY OF THE INVENTION

The invention provides novel, highly-reactive composite nanofibers, which are preferably fabricated via electrospinning, a scalable and industrially-viable technique that yields non-woven nanofiber mats. Composite benefits are two-fold. First, these materials are much stronger than conventional approaches to nanofiber production. Thus, the filters produced herein are more robust (e.g., flexible, durable, etc.) than conventional electrospun nanofibers. Second, composites can exhibit exquisite reactivity that exploits synergies between different nanofiber components. For example, several types of engineered nanomaterials (e.g., carbon nanotubes and metal oxide nanoparticles) are known to be highly reactive toward common pollutants that plague drinking water supplies. However, their use in drinking water treatment is limited by practical challenges (e.g., high pressure drops through packed beds of nanoparticles/nanotubes) and concerns over the possible release of engineered nanomaterials, which can be toxic, into the treated water supply. Composites enable the deployment of nanostructured materials for water treatment within a self-contained membrane with high water fluxes. In certain embodiments, the filters are also modular, and thus can be assembled into a single, multi-target treatment system tailored to the problems of a particular water supply (e.g., metals, pesticides, pathogens, and/or other contaminants). Other potential fields of application for these technologies include energy generation, air purification and carbon capture, environmental monitoring and sensing, disinfection and antimicrobial materials, and protective clothing The composites of the invention enable the deployment of nanostructured materials for water treatment within a self-contained, robust membrane that permits high water fluxes (and thus faster rates of high quality water production). The invention not only allows deployment of nanomaterials, providing a highly reactive technology within a small physical footprint, but provides a modular treatment system with the potential to exhibit high removal capacities toward broad suites of chemical pollutants and their complex mixtures.

The invention overcomes problems typically encountered with electrospun nanofiber devices. Often times, electrospun nanofibers are too weak or too brittle to be of practical use. However, by developing novel composites, we not only improve their reactivity (and thus treatment efficiency), but also their strength. This leads to composites nanofibers and electrospun filters that can be more easily handled and manipulated. The robust platform is user-friendly and deployable across a range of technology designs and reactor configurations.

Accordingly, in one embodiment, the invention is directed to precursor compositions, comprising:
  at least one polymer, particularly thermoplastic polymer;
  at least one non-aqueous solvent for said polymer;
  optionally, at least one surface-segregating surfactant;
  metal oxide nanoparticles;
  optionally, carbon nanotubes, graphene, or a combination thereof; and
  optionally, a porogen.

In other embodiments, the invention is directed to composites, comprising,
  polymeric nanofibers;
  metal oxide nanoparticles;
  wherein at least a portion of said metal oxide nanoparticles are embedded within said polymeric nanofibers and at least another portion of said metal oxide nanoparticles embedded on said polymeric nanofibers;
  optionally, surface-segregating surfactant; and
  optionally, carbon nanotubes, graphene, or a combination thereof.

In certain embodiments, the composites are prepared via electrospinning.

In another embodiment, the invention is directed to non-woven mats, comprising:
  the composites described herein.

In yet other embodiments, the invention is directed to point-of-use filtration devices, comprising:
  the nonwoven mats described herein.

In further embodiments, the invention is directed to modular filter systems, comprising:

a first module comprising the nonwoven mat described herein;

a second module capable of chemical oxidation, disinfection, or a combination thereof; and at least one further module capable of sorbing dissolved organic matter, oxidation byproducts, or a combination thereof.

In certain other embodiments, the invention is directed to methods of preparing a composite, comprising electrospinning the precursor composition described herein to form a composite; and pyrolyzing said composite (e.g., for carbon-based nanofibers composites, pyrolysis up to 1000° C. for 1 h in an inert, e.g., $N_2$ atmosphere); or hydrothermally treating carbon- and polymer-based nanofibers composites to generate carbon- or polymer-metal oxide core shell nanofibers (e.g., iron oxide core shell nanofibers are produced at 90-100° C. for up to 24 h in a solution of ferric chloride and L-arginine; and titanium dioxide core shell nanofibers are produced at 150-200° C. in a mixture of hydrochloric acid and sulfuric acid with titanium butoxide).

In yet further embodiments, the invention is directed to methods, comprising:

providing a nonwoven mat described herein; and contacting a liquid comprising at least one contaminant with said mat;

wherein said contaminant is a material selected from the group consisting of heavy metals, heavy metalloids, and oxyanions.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Definitions

Figure 1:
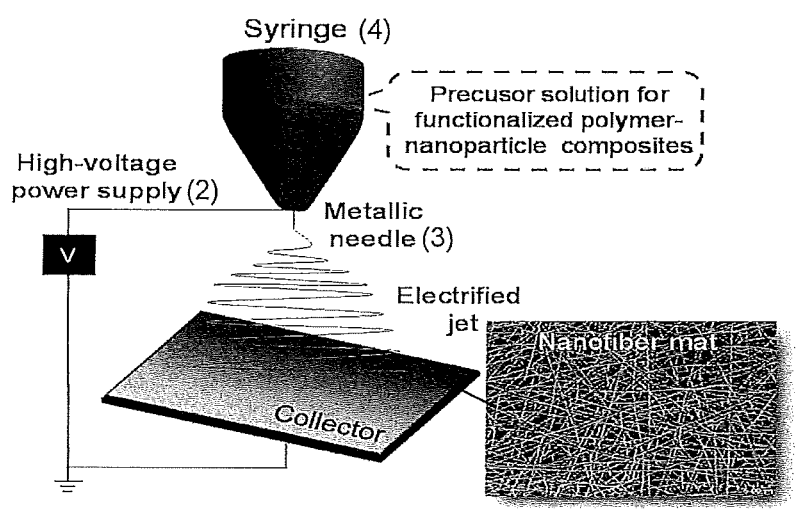
FIG. 1 is a schematic diagram an electrospinning apparatus 1 with high-voltage power supply 2, spinneret (metallic needle) 3, collector (aluminum foil/metallic drum), and syringe pump 4.

The following definitions are provided for the full understanding of terms used in this specification.

As used herein, the article "a" means "at least one," unless the context in which the article is used clearly indicates otherwise.

As used herein, the terms "separation" and "separating" mean the act or process of isolating or extracting from or of becoming isolated from a mixture (a composition of two or more substances that are not chemically combined).

As used herein, the terms "purification" and "purifying" means the actor process of separating and removing from anything that which is impure or noxious, or heterogeneous or foreign to it.

As used herein, the term "fluid" refers to a continuous amorphous substance that tends to flow and to conform to the outline of its container, including a liquid or a gas, and specifically includes solutions (where solids dissolved in the liquid or gas) and suspensions (where solids are suspended in liquid or gas).

As used herein, the term "portable" refers to a device that may be capable of being carried or moved. Preferably, the term refers to a device that may be carried by an adult or child with little or no effort. However, the term also refers to a device that is not permanently affixed to a permanent structure and is of sufficiently low mass and bulk that it may be easily transported as part of a vehicle or transportation device. Preferably, the oxygen enrichment devices of the invention weigh less than about 1 kg.

Reference will now be made in detail to the preferred embodiments of the invention, examples of which are illustrated in the drawings and the examples. This invention may, however, be embodied in many different forms and should not be construed as limited to the embodiments set forth herein. In addition and as will be appreciated by one of skill in the art, the invention may be embodied as a product, method, system or process.

Accordingly, in one embodiment, the invention is directed to precursor compositions, comprising:
at least one polymer, particularly thermoplastic polymer;
at least one non-aqueous solvent for said polymer;
optionally, at least one surface-segregating surfactant;
metal oxide nanoparticles;
optionally, carbon nanotubes, graphene, or a combination thereof; and
optionally, a porogen.

In other embodiments, the invention is directed to composites, comprising, polymeric nanofibers;
metal oxide nanoparticles;
wherein at least a portion of said metal oxide nanoparticles are embedded within said polymeric nanofibers and at least another portion of said metal oxide nanoparticles embedded on said polymeric nanofibers;
optionally, surface-segregating surfactant; and
optionally, carbon nanotubes, graphene, or a combination thereof.

In certain embodiments, the composites are prepared via electrospinning.

In another embodiment, the invention is directed to nonwoven mats, comprising:
the composites described herein.

In yet other embodiments, the invention is directed to point-of-use filtration devices, comprising:
the nonwoven mats described herein.

In further embodiments, the invention is directed to modular filter systems, comprising:
a first module comprising the nonwoven mat described herein;
a second module capable of chemical oxidation, disinfection, or a combination thereof (such as, for example, a Mn-doped $TiO_2$ nanofiber composite with or without carbon nanostructures); and
at least one further module capable of sorbing dissolved organic matter, oxidation byproducts, or a combination thereof (such as, for example, carbon nanofibers with or without carbon nanostructures).

In certain other embodiments, the invention is directed to methods of preparing a composite, comprising:
electrospinning the precursor composition described herein to form a composite; and
pyrolyzing or hydrothermally treating said composite.

In yet further embodiments, the invention is directed to methods, comprising:
providing a nonwoven mat described herein; and
contacting a liquid comprising at least one contaminant with said mat;
wherein said contaminant is a material selected from the group consisting of heavy metals, heavy metalloids, and oxyanions.

The composites of the invention are useful for removing contaminants, such as, for example, cadmium, mercury, lead, arsenic, manganese, chromium, cobalt, nickel, copper, zinc, selenium, silver, antimony, thallium, nitrate, nitrite, phosphate, arsenate, chromate, uranium, radionuclides, rare earth metals, and mixtures thereof.

Polymers useful in the precursor compositions of the invention include, but are not limited to, is polyacrylonitrile (PAN), polymethyl methacrylate, polystyrene, polyvinylidene difluoride (PVDF), ethylene-vinyl acetate (EVA), or mixtures thereof. The polymer may be present at a level of about 5% by weight to about 25% by weight, preferably, about 5% by weight to about 15% by weight, based on the total weight of the precursor composition.

Non-aqueous solvent useful in the precursor compositions of the invention include, but are not limited to, ethanol, glacial acetic acid, N,N-dimethyl acetamide, tetrahydrofuran, acetone, N,N-dimethyl formamide, or mixtures thereof. The wherein said non-aqueous solvent is present at a level of about 75% by weight to about 95% by weight, based on the total weight of the precursor composition, preferably, about 80% by weight to about 95% by weight, based on the total weight of the precursor composition.

Metal oxides useful in the precursor compositions of the invention include, but are not limited to, iron oxide (such as hematite, goethite, ferrihydrite, magnetite and mixtures thereof), iron oxyhydroxide, aluminum oxide, and mixtures thereof. The inclusion of aluminum in the metal oxide provides for the removal of other targets, such as fluoride, for example, and can be used to alter the charge and physical properties of the iron (as a dopant) to provide a better sorbent. The metal oxides may be present at a level of about 0.1% by weight to about 10% by weight, preferably, about 0.5% by weight to about 7.5% by weight, based on the total weight of the precursor composition, based on the total weight of the precursor composition.

Surfactants are often included in electrospinning precursor solutions to influence conductivity and viscosity. In addition to morphological benefits (e.g., more uniform diameter distributions), we have discovered that certain surface-segregating surfactants also impart chemical functionality. The optional surface-segregating surfactants useful in the precursor compositions of the invention may be an anionic surfactant or a cationic surfactant. Suitable surface-segregating surfactants useful in the precursor compositions of the invention include, but are not limited to, sodium dodecyl sulfonate (SDS), cetyltrimethylammonium (cetrimonium) bromide (CTAB), tetra-n-butylammonium bromide (TBAB), cetyltrimethylammonium chloride (CTAC), and mixtures thereof.

The surface-segregating surfactant may be a polymerizable surfactant. Suitable surface-segregating surfactants include surfactants that contain polymerizable groups such as styrene, acrylic, methacrylic and acrylamides, including α-β-ethylenically unsaturated poly(alkyleneoxy) compounds that display surfactant activity and that polymerize when used in the emulsion polymerization of ethylenically unsaturated monomers, including vinyl monomers. Other suitable surfactants include polymerizable quaternary ammonium surfactants that contain acrylate or methacrylate groups and have chain lengths between about 10 to 18 carbons, tetradecylethylmethacrylate dimethylammonium bromide (and others disclosed in U.S. Pat. No. 5,162,475), the hindered aminoethers (such as 2,2,6,6-tetramethyl-1-piperidinyloxy (TEMPO) aminoether) disclosed in Hu, S., Malpert, J. H., Yang, X. and Neckers, D. C. (2000) Exploring Chromophore Tethered Aminoethers as Potential Photoinitiators for Controlled Radical Polymerization. Polymer, 41, 445-452.(DOI: 10.1016/S0032-3861(99)00188-3), and DOI 10.1016/j.polymer.2008.03.045, each of which is incorporated herein by reference in its entirety). The surface-segregating surfactant may be present at a level of about 0.1% by weight to about 3% by weight, preferably, about 1% by weight to about 2% by weight, based on the total weight of the precursor composition.

In certain embodiments, the carbon nanotubes are multi-wall carbon nanotubes. In certain other embodiments, the carbon nanotubes are unfunctionalized multi-wall carbon nanotubes. The carbon nanotubes may be present at a level of about 0.1% by weight to about 3% by weight, preferably, about 1% by weight to about 2% by weight, based on the total weight of the precursor composition.

A porogen is any material (e.g., chemical or particle) that can be used to introduce porosity into a structure, typically through the process of embedding the material during synthesis and removing it (via physical or chemical means) via post-processing. Suitable examples include leachable materials, (such as surfactants that can be leached or washed from the structure to introduce porosity, such as sodium dodecyl sulfonate (SDS), sodium dodecyl benzene sulfonate (SDBS), other sulfonate surfactants, and the like) and nanoscale materials (e.g., calcium-based oxides or carbonates that can be leached/dissolved from the structure post-synthesis using mild acid or base, leaving behind a pore). In certain embodiments, the porogen is an acid-soluble bulking agent having a particle size of about 3 nm to about 40 nm (such calcium carbonate, zinc oxide, and mixtures thereof). While not preferred porogens due to the need for increased temperatures sufficiently to volatilize them from the material), volatile acids, such as terephthalic acid, phthalic acid, or mixtures thereof, may be used in certain embodiments. The porogen may be present at a level of about 0.25% by weight to about 5% by weight, preferably, about 0.5% by weight to about 3.5% by weight, based on the total weight of the precursor composition.

In certain embodiments, the precursor composition may further comprise quaternary ammonium salts having at least one $C_{12}$-$C_{18}$alkyl group (such as dodecyltrimethylammonium bromide, trimethyloctadecylammonium bromide, and the like). The salts may be present at a level of about 0.1% by weight to about 3% by weight, preferably, about 1% by weight to about 2% by weight, based on the total weight of the precursor composition.

In certain embodiments, the precursor composition may further comprise a N-ionophore (such as nitrate ionophore VI (or 9-hexadecyl-1,7,11,17-tetraoxa-2,6,12,16-tetraazacycloeicosane) and nitrate ionophore V (9,11,20,22-Tetrahydrotetrabenzo[d.f,k,m][1,3,8,10]tetraazacyclotetradecine-10,21-dithione), and the like). The N-ionophores may be present at a level of about 0.1% by weight to about 3% by weight, preferably, about 1% by weight to about 2% by weight, based on the total weight of the precursor composition.

In certain embodiments of the invention, the composite is prepared via electrospinning of the precursor composition disclosed herein.

In certain embodiments, the composite may further comprise at least one conducting polymer fiber. Composites containing the conducting polymer fiber may be prepared via dual-extrusion electrospinning. Suitable conducting polymer include, but are not limited to, polypyrrole, polyaniline, polythiophene, poly(3-hexylthiophene), and poly(3,4-ethylenedioxythiophene), or mixtures thereof.

Sufficient porosity is an important feature of the nanofiber mats to increase the amount of material surface area, and in turn, removal capacity available for water treatment processes. In certain embodiments, the composite has a pore volume, as determined by $N_2$-BET analysis, of at least about 0.1 $cm^3$/g.

The mechanical strength is an important property of the nanofibers and nanofiber mats. Inorganic nanofibers are typically brittle and lack the material strength to make them practical in treatment applications. However, the composites of the invention overcome this problem. In certain embodiments, the composite has a Young's Modulus, as measured by atomic force microscopy indentation, of less than about 100 MPa.

Figure 12:
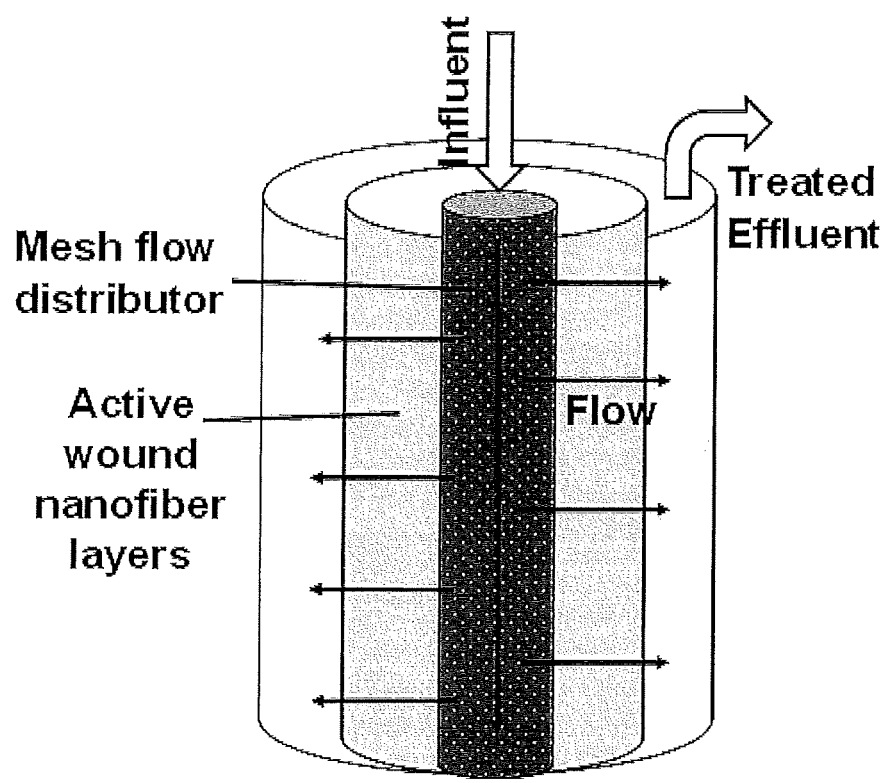
FIG. 12 is a schematic diagram of a spiral wound configuration for dead end filtration applications of one embodiment of the invention.

The composites of the invention may be formed into a nonwoven mat of essentially any size. For point-of-use filtration devices and applications, smaller nonwoven mats may be preferred. The dimensions of the nonwoven mats depends on the application point. In a single use/drinking water bottle, for example, the mat can be quite small (about 50 cm in diameter and about 10 to 1000 μm thick). In a larger volume application (such as at a tap or inside a refrigerator, for example), a long sheet of material that is wound into a spiral that would increase thickness/retention time in the sorbent layer for improved performance and longer lifetime may be used, such as shown in FIG. 12.

The nanofiber composites of the invention may be used in water treatment to remove heavy metals, heavy metalloids, and oxyanions, including nitrate, nitrite, phosphate, arsenate, and chromate. The composites may also be used in energy generation and recovery, air purification, carbon capture, environmental monitoring and sensing, disinfection and antimicrobial materials, protective clothing, and the like.

The invention is directly applicable to water treatment (both drinking water and wastewater), including point-of-use and point-of-entry treatment systems (e.g., attachment to taps or other "in-home" treatment systems). Due to their inherently small scale as nanomaterials, there are a range of portable and/or personalized water treatment devices (e.g., integration into water bottles), which could be of interest in not only commercial, but also industrial and military (e.g., front-line deployment and forward operating bases) application. Notably, electrospinning allows composites to be easily produced at larger scales, thus also facilitating the application of these materials in full-scale water treatment. A range of other applications are available via this platform, including energy recovery systems, carbon capture, air purification, and personal protection in fields where exposure to airborne contamination is of concern (e.g., decontamination of pathogenic bioaerosols to reduce health risks to works in concentrated feeding operations).

Carbon Capture

The nonwoven mats of the invention may be used in conjunction with separate nonwoven mats for carbon capture, wherein the separate nonwoven mats use N-doped carbon.

N-Functionalized Polymer Nanofibers:

Polymeric nanofibers can be synthesized using methods described herein with N-functional groups loaded either into their bulk and/or onto their surface. For example, bulk loading of N-containing functional groups can be accomplished by varying the level of polyethylenimine (PEI) in a PAN precursor solution. Alternatively or additionally, surface N-functionalities can be introduced via post-synthesis functionalization of PAN nanofibers with hydroxylamine, which converts the surface nitrile groups in PAN to amidoxime (AO) groups. In other embodiments, N-doped CNTs can be integrated into the polymeric electrospinning solutions. The N-containing surface groups on the nanofibers react with the $CO_2$. While it is not wishing to be bound by theory, it is believed that adjacent surface amino groups, for example, react with $CO_2$ to form an ammonium carbamate species ($-NHCO_2^-$), which may be recovered during solvent regeneration, for example.

The composites of the invention may be used in other applications. For example, in water treatment, they may be used for antimicrobials/disinfection (Ag composites with biocidal surfactant composites). Also, they have application in sensing and passive sampling.

It will be apparent to those skilled in the art that various modifications and variations can be made in the present invention and specific examples provided herein without departing from the spirit or scope of the invention. Thus, it is intended that the present invention cover the modifications and variations of this invention that come within the scope of any claims and their equivalents.

EXAMPLES

The present invention is further defined in the following Examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

Electrospinning Protocol.

A typical electrospinning apparatus is shown in in the schematic of FIG. 1 with high-voltage power supply 2, spinneret (metallic needle) 3, collector (aluminum foil/metallic drum), and syringe pump 4. After preparation and prior to use, the kinematic viscosity of select sol gels was estimated by measuring the time for a set volume of sol gel to flow by gravity through a fixed length of tubing. The precursor solutions were then loaded into a 12 mL plastic syringe (HSW Norm-Ject). The syringe was connected to 2.0 mm ID polyethylene (PE) tubing via a PE 1/16" female luer lock fitting (NanoNC Co., Ltd). The tubing was also connected to a metal nozzle adapter (NanoNC Co., Ltd) via a PE 1/16" male luer lock fitting, and a 25 G 1/2" needle was attached to the other end of the nozzle adapter. The needle tip was located at a distance of 10 cm from the surface of a 9-5/16"-circumference metal drum collector (SPG Co., Ltd; Korea), which was coated in Al foil and grounded. During electrospinning, the precursor solution was pumped through the needle at 0.5 mL/h (New Era Pump Systems, Inc.), a positive 12 kV voltage was applied at the needle tip (Acopian), and the grounded collector was rotating at 500 rpm (Dingtuo Technology). The high voltage difference between needle tip and collector caused formation of a whipping polymer jet, evaporation of the solvent, and deposition of non-woven polymer (or polymer CNT composite) nanofibers on the collector surface.

Instrumentation for Nanofiber Characterization.

The morphology of electrospun nanofiber mats was investigated using a field-emission scanning electron microscope (SEM) (S4800, Hitachi) at an acceleration voltage of 1.8 kV. All samples were sputter-coated with a thin layer of gold/palladium (60:40 Au:Pd) prior to SEM imaging. Average fiber diameters were developed from measurement of 50-100 nanofibers in ImageJ software. Morphology of selected mats was also examined using transmission electron microscopy (TEM) (JEOL JEM-1230) at an operating voltage of 120 kV. Surface area and pore volumes were determined by $N_2$-BET analysis using a Micromeritics ASAP 2020 Physisorption Analyzer. All samples were degassed at 300° C. for 3 hours prior to analysis. Surface composition was analyzed with a custom Kratos Axis Ultra X-ray photoelectron spectroscopy (XPS) system equipped with a monochromatic Al Kα X-ray source. XPS was used to collect full spectrum survey scans, as well as to examine C 1s, O 1s, and N 1s regions.

Strength Analysis Procedures.

The mechanical strength of nanofibers and nanofiber mats was characterized by two complementary methods. The goal of characterization was to develop a quantitative assessment of the influence of CNT inclusion and macroporosity on nanofiber strength.

Atomic Force Microscopy Nanoindentation. The mechanical strength of individual nanofibers was characterized using atomic force microscopy (AFM) based nanoindentation conducted on a Molecular Force Probe 3D AFM (Asylum Research, Santa Barbara, Calif.). AFM height images and nanoindentation measurements were performed at room temperature in air, using silicon nitride probes (Mikromasch, San Jose, Calif., CSC37) with a nominal spring constant of 0.35 N/m and a typical tip radius of curvature of 10 nm. The tip radius of curvature was verified using scanning electron microscopy (SEM) and was found to be approximately 10 nm, as expected. Actual spring constants were determined using the built-in thermal noise method. Topographic images were collected using intermittent contact mode (AC mode) or contact mode at a typical scan rate of 1 Hz. Nanofiber mat samples were adhered to freshly cleaved atomically flat mica (V-I grade, SPI Supplies, Westchester, Pa.) using double-sided tape, and topographic images were obtained prior to indentation experiments in AC mode. In these measurements, force-displacement curves were collected during the AFM probe motion towards and away from the sample. The probe was initially ~200 nm away from the surface, was moved towards the nanofiber surface until a predetermined force of 10 nN was achieved, and then the applied force was reversed until the probe returned to the initial position. A maximum force of 10 nN was selected because no sign of mechanical damage on the sample surface has been observed under such conditions after a series of repeated force-displacement measurements in previous studies. In order to ensure reproducibility, repeated force curves (~10 curves) were collected at a minimum of 5 sampling locations per nanofiber for 10 individual nanofibers within each mat. Force-displacement curves were also collected on the mica substrate in order to calibrate the deflection sensitivity of the instrument, which allowed the conversion of the force-displacement curves to force versus tip-sample separation plots. Overall, four different probes were used for the nanoindentation measurements.

Young's modulus values were extracted from force versus tip-sample separation data by fitting nanoindentation plots to a rearranged form of the Hertzian model, which assumes elastic contact. All force-displacement plots herein showed no deviation between the approach data and the retract data. Thus the indentation could be assumed purely elastic, allowing use of the Hertzian elastic model. The Hertzian model is described by Equation S1 below, where F is the loading force, R is the tip radius of curvature, Δ is the tip-sample separation, E is the Young's modulus, C is a constant, and v is the Poisson's ratio of the sample. Use of this rearranged form eliminated the necessity of knowing the exact contact position between the tip and the sample, which is typically challenging. Based on Equation S1, a plot of the force to the 2/3 power vs. the tip-sample separation should be linear in the contact region. The Young's modulus of the sample can then be calculated using the linear slope of the $F^{2/3}$ vs. Δ plot in the contact region, with known or reported values of the tip radius of curvature and the Poisson's ratio. Here, R and v were assumed to be 10 nm (using SEM) and 0.3 (typical value for organic nanomaterials), respectively.

$$F^{2/3} = C - \left(\frac{4\sqrt{R}}{3(1-u^2)}E\right)^{2/3} \Delta \quad (S1)$$

Load-Displacement Testing. Stress-strain curves were also developed for select nanofiber mats from load-displacement data collected in a BioTense Perfusion Bioreactor (ADMET, Inc., Norwood, Mass.), which consisted of a linear actuator, sample grips, a reactor frame, and a 250 g load cell. Data acquisition was performed at 10 samples/sec through the MTestQuattro System (ADMET, Inc., Norwood, Mass.). Unlike the AFM-based nanoindentation performed on individual nanofibers within a mat, this load-displacement technique provided understanding as to the average mechanical properties of the entire, bulk nanofiber mat. Optical images of the system were recorded with a DS-Qi1 Nikon CCD camera. Dog-bone-shaped pieces (with area for break 2 mm width by 8 mm length by 0.25 mm thickness) were cut out using a stainless steel punch. The dog-bone pieces were clamped to the sample grips with flat alligator clips, with the thin portion of the wishbone in the gap between the arms. The load cell can measure a maximum tensile load of 2 N, and the closed-loop, servo-controlled actuator can provide a 25 mm stroke. The initial gap between the arms was measured with calipers and recorded (5.78 mm), the position was zeroed within the associated software, and the initial load on the sample was recorded. The dog-bone pieces were loaded to failure at a rate of 10 mm/min, with the maximum extension set to 4 mm. Cross-sectional images of the area at the breakpoint were taken with an optical microscope (Nikon Eclipse Ti with Plan Fluor 4× objective), and the average thickness of the mat at the breakpoint was determined via measurement with Image J software to allow the area at the break to be quantified. Strain was calculated as the change in position during the test ($I$-$I_0$) divided by the initial gap (L), and stress was calculated as the recorded load (F) during the test divided by the cross-sectional area (A) of the dog-bone (Equations S2 and S3 below, respectively). The Young's Modulus was calculated as the average of the positive slopes of the stress-strain curves.

$$\text{Strain} = \frac{I-I_0}{L} *(100\%) \quad (S2)$$

$$\text{Stress} = \frac{F}{A} \quad (S3)$$

Batch Sorption Experimental Details.

Timescales necessary to achieve sorption equilibrium (i.e., no further change in solution phase concentration) were determined first via kinetic experiments conducted in 20 mL vials sealed with butyl stoppers. Each vial contained 15 mL of 5 mM phosphate buffer solution adjusted to pH 7 and a sorbent (e.g., nanofiber mat or GAC) at a mass loading at 0.5 g/L. Reactors were spiked at the start of the experiment with either 50 µM of atrazine (ATZ) or sulfamethoxazole (SMX) from 50 mM stock solutions prepared in methanol (which produced <$10^{-3}$% v/v MeOH in the final reactor suspension). Reactors were well-mixed throughout the experiment on a rotator (Cole-Palmer Roto-Torque). Samples were taken periodically and then passed through a 0.2 µm Nylon syringe filter to remove the sorbent material. Controls containing no sorbent were conducted in parallel to reactors with nanofiber mats to account for any inadvertent losses via sorption to the vial stopper and/or syringe filter during equilibration and sample processing. After filtration, samples were transferred to 1.5 mL amber vials for subsequent analysis via high pressure liquid chromatography equipped with a photodiode array detector (HPLC-DAD).

Sorption isotherms were collected in batch experiments performed in well-mixed reactors similar to those used for kinetic experiments. The sorbent mass loading was held constant (0.4 g/L). Reactors were spiked at the start of the experiment with varying concentrations (13-170 µM) of ATZ or SMX from 50 mM stock solutions prepared in methanol (resulting in <$3.4\times10^3$% v/v MeOH in the final reactor suspension). Based on results from kinetic experiments, isotherm samples were taken at 0 and 6 h for nanofiber mats and after 24 h for GAC. Samples were then passed through a 0.2 µm Nylon syringe filter to remove the sorbent material. Sample post-processing and analysis was identical to that performed for kinetic sorption experiments. Batch pH-edge experiments were also performed in identical reactors, with 0.4 g/L sorbent mass loading, 70 µM initial concentration SMX or metoprolol, 5 mM phosphate buffer (pH 6-9), and sample post-processing and analysis identical to that for sorption isotherm experiments.

Analytical Methods.

High concentration (>0.1 mg/L) aqueous samples from batch experiments were analyzed on a 1200 series Agilent HPLC equipped with an Eclipse Plus C18 column (4.6 mm×150 mm, 5 µm particle size) and a photodiode array detector (DAD). Analysis of ATZ used a mobile phase of 50:50 acetonitrile (ACN):$H_2O$, a flow rate of 1 mL/min, an injection volume of 20 µL, and a 223 nm detection wavelength, whereas SMX analysis used a 30:70 ratio of methanol (MeOH):5 mM phosphate buffer pH 5, a flow rate of 1 mL/min, an injection volume of 25 µL, and a 268 nm detection wavelength. Samples with lower concentration (5 µg/L; i.e., those used in single-target, flow-through systems) were analyzed via HPLC-MS/MS, with a 1200 series Agilent HPLC equipped with an Eclipse Plus C18 column (4.6 mm×150 mm, 5 µm particle size) and a QQQ detector (Agilent 6460 Triple Quad LC/MS). Analysis of ATZ was performed via a MS2 SIM method, with a mobile phase of 50:50 ACN:$H_2O$, a flow rate of 0.4 mL/min, an injection volume of 5 µL, and a parent compound mass of 216, whereas SMX analysis was performed via a MS2 SIM method, with a mobile phase of 30:70 MeOH:$H_2O$, a flow rate of 0.4 mL/min, an injection volume of 5 µL, and a parent compound mass of 254.

Example 1: α-$Fe_2O_3$ Coated Nanofiber Networks

Abbreviations
PAN: polyacrylonitrile
CTAB: cetyltrimethylammonium bromide
Fh: ferrihydrite Experimental Methods Reagents.

All chemicals were reagent grade or better and used as received. Details of specific reagents used in hybrid synthesis and performance testing are provided below.

Synthesis of α-$Fe_2O_3$ Coated Nanofiber Networks.

Electrospun PAN nanofibers seeded with α-$Fe_2O_3$ nanoparticles were hydrothermally coated with α-$Fe_2O_3$ (hereafter simply Fe$_2$O$_3$) to obtain polymer-iron oxide hybrid nanofiber networks. To assess seed nanoparticle influence on hybrid development, 10 nm Fe$_2$O$_3$ nanoparticles were prepared, suspended in 3.5 mL N,N-dimethylformamide (DMF, BDH, 99.8%), and sonicated for 5 h. PAN (Aldrich, MW 150,000) was added and the solution was thermally mixed for 2 h at 60° C. The sol gel was allowed to cool to room temperature and then electrospun with a flow rate of 0.5 mL/h, 18 kV/10 cm, and 23 G needle. After 6 h, the electrospinning process was stopped and the mat was peeled off the grounded collector. PAN/Fe$_2$O$_3$ nanofiber networks were coated by placing pieces (~6 cm×10 cm) in 150 mL solution of 0.14 M FeCl$_3$·6H$_2$O (Sigma-Aldrich, 97%) and 0.14 M L-arginine (Sigma, ≥98.5%) solution in a plastic container that was then loosely covered and heated at 95° C. for 12 h. After treatment, mats were rinsed with deionized (DI) water, 0.1 M hydrochloric acid (HCl, Fisher Scientific, Certified ACS Plus), 0.1 M sodium hydroxide (NaOH, Sigma Aldrich, ≥97%), and sonicated in DI water for 1.5 h to ensure the removal of extraneous material not firmly affixed to the surface. For initial optimization of the material, a slightly modified protocol was used in which circular pieces of PAN/Fe$_2$O$_3$ (diameter of ~30 mm) were treated with 35 mL of solution in a Teflon-lined stainless steel autoclave at 95° C. for 1 to 12 h.

Nanofiber Network Characterization.

Nanofiber networks were characterized to determine their physical and chemical properties. Nanofiber diameter and extent of hydrothermal coating were examined with a Hitachi S-4800 scanning electron microscope (SEM). X-ray diffraction (XRD, Rigaku MiniFlexll) was used to confirm the phase of nanoparticles and nanofiber coatings as hematite. Surface area of the materials was determined via N$_2$-BET analysis (Quantachrome Nova 4200e) after outgassing samples at 40° C. for 6 h prior to analysis.

Adsorption Experiments.

Pieces of nanofiber networks were reacted in batch with As, Cu, Cr, and Pb to assess their reactivity. Experiments were conducted in 20 mL glass vials sealed with butyl rubber septa. Approximately 5 mg of material (typically a 0.5 cm×0.5 cm mat of nanofibers) was placed in 10 mL of appropriate buffer solution (e.g., 10 mM MES hydrate (Sigma, ≥99.5%) or HEPES (RPI, ≥99.9%)) adjusted to a pH value between 6 and 8 and containing either potassium chromate (Sigma-Aldrich, ≥99.0%), sodium arsenate dibasic heptahydrate (Sigma, ≥98.0%), copper chloride dihydrate (Sigma-Alrich, ≥99.0%), or lead nitrate (Fisher Scientific). Vials were placed on a rotator (Cole-Parmer Roto-Torque) for times ranging from 10 minutes to 24 hours, after which 5 mL samples were taken, acidified to 2% HNO$_3$ and filtered with 0.45 µm nylon filters for analysis.

Metals Analysis.

Samples from adsorption experiments were analyzed with inductively coupled plasma optical emission spectrometry (ICP-OES, PerkinElmer Optima 7000 DV). The ICP-OES was calibrated with standards for As, Cu, Cr, and Pb (Inorganic Ventures) preceding analysis of samples. Cr samples were also analyzed colorimetrically.

Results and Discussion

Nanofiber Network Optimization and Characterization.

Figure 2:
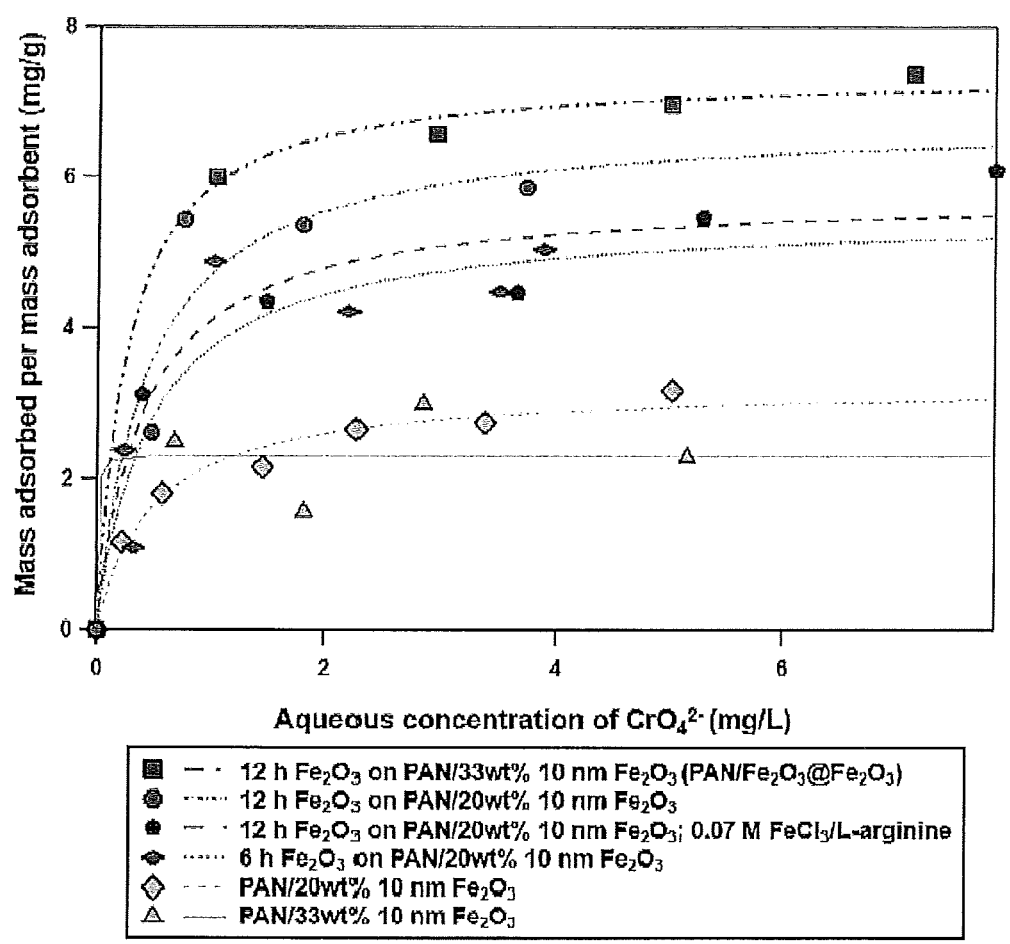
FIG. 2 shows adsorption isotherms for $CrO_4^{2-}$ for materials without hydrothermal treatment, less Fe in the hydrothermal treatment solution, different loadings of 10 nm $Fe_2O_3$ nanoparticles in PAN, and different hydrothermal treatment times. Isotherms are given in terms of mass adsorbed per mass adsorbent. Experiments were completed in pH 6 10 mM MES buffer.

FIG. 2 shows CrO$_4^{2-}$ adsorption isotherms for a suite of PAN/Fe$_2$O$_3$ composites, which were synthesized by systematically tuning iron oxide loading on PAN. Results show that the loading of Fe$_2$O$_3$ on PAN, and thus metal sorption capacity, could be controlled either by varying the amount of Fe$_2$O$_3$ nanoparticles seeded into PAN, the concentration of dissolved iron in hydrothermal solution, or the length of hydrothermal treatment. PAN/Fe$_2$O$_3$ hybrid nanofiber networks, regardless of the amount of seed Fe$_2$O$_3$ nanoparticles embedded in the PAN, exhibited low adsorption capacities for CrO$_4^{2-}$ prior to hydrothermal coating with surface Fe$_2$O$_3$ (FIG. 2). For hydrothermally surface-coated nanofiber networks, performance trends emerged. Specifically, lower loadings (<20 wt %) of embedded, seed Fe$_2$O$_3$ nanoparticles (although seed particle size had no influence), shorter hydrothermal treatment times (<6 h), lower concentrations of FeCl$_3$·6H$_2$O and L-arginine during hydrothermal processing (e.g., 0.07 M as compared to 0.14 M) yield composites with lower adsorption capacities for CrO$_4^{2-}$.

Figure 3:
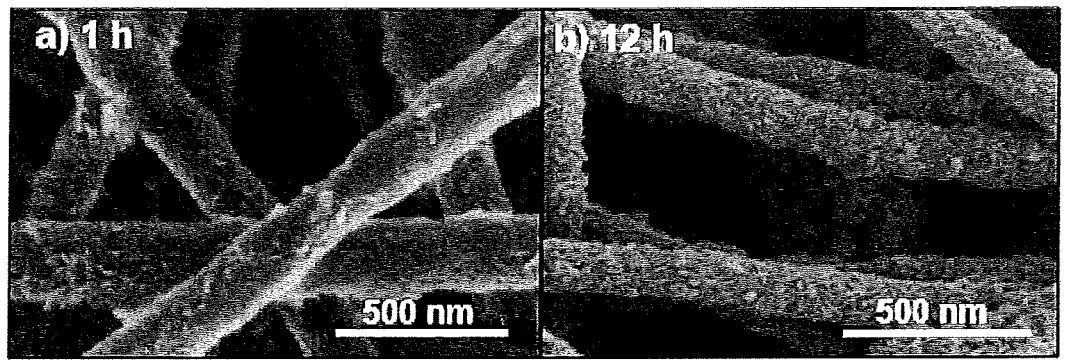
FIG. 3 shows PAN/$Fe_2O_3$@$Fe_2O_3$ nanofiber networks at a) 1 h and b) 12 h of hydrothermal treatment. Longer hydrothermal treatment resulted in a thicker coverage of $Fe_2O_3$ nanostructures.

After extensive nanofiber tailoring, an optimal synthetic formulation (i.e., optimal performance and simplest synthesis) was identified, consisting of 33 wt % 10 nm Fe$_2$O$_3$ nanoparticles in PAN treated in 0.14 M Fe solution for 12 hours. We attribute this material's superior performance to its high loading of seed nanoparticles, which produced an abundance of uniformly distributed nucleation sites on the PAN surface for additional deposition and growth of Fe$_2$O$_3$ nanostructures during hydrothermal coating. In combination with a high dissolved iron content in the hydrothermal solution and longer treatment times, this allowed for more uniform coating and growth of Fe$_2$O$_3$ nanostructures on the PAN surface, and in turn more reactive, external surface area for CrO$_4^{2-}$ uptake. Evidence of this growth can be seen in FIG. 3, which shows SEM images of nanofibers after 1 h and 12 h of hydrothermal treatment, with more Fe$_2$O$_3$ nanostructures having grown on the nanofibers at the latter time. Accordingly, this optimal recipe was used for all further characterization and adsorption experiments.

Figure 4:
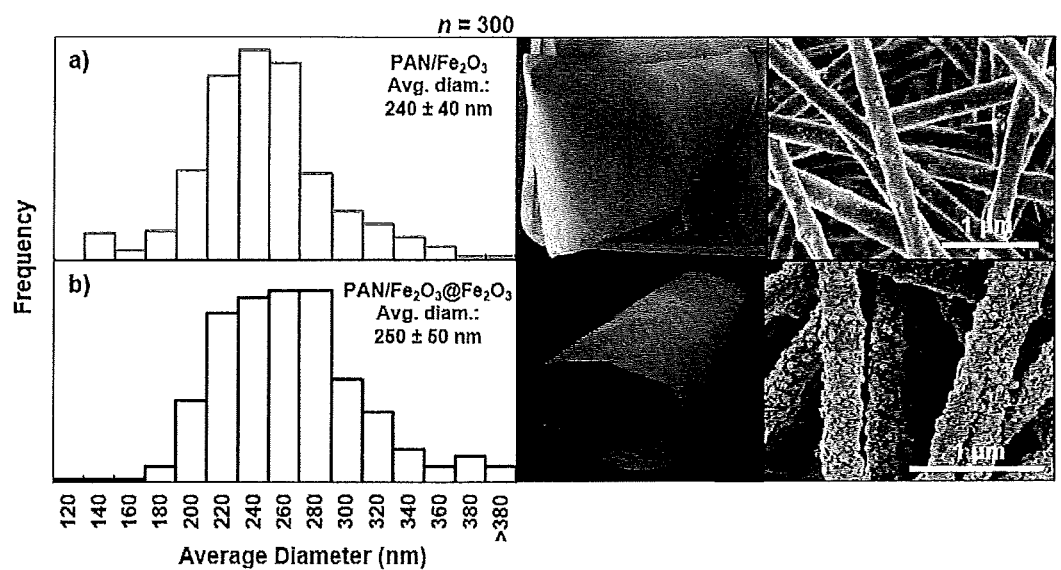
FIG. 4 shows size distribution histograms for PAN/$Fe_2O_3$ and PAN/$Fe_2O_3$@$Fe_2O_3$ nanofibers with corresponding images of the mats and SEM images of the nanofiber networks.

Notably, hydrothermal treatment of PAN/Fe$_2$O$_3$ did not eliminate the flexibility or wettability of the nanofiber network despite extensive surface coating with Fe$_2$O$_3$. Mats could be bended and rolled (FIG. 4, panel b), which may help facilitate their application in reactor platforms (e.g., spiral-wound membrane filters) that optimize their treatment capacity. Further, SEM imaging and histograms revealed that although hydrothermal treatment resulted in clear growth of rod-like and particulate nanostructures on the surface of PAN/Fe$_2$O$_3$ nanofibers, Fe$_2$O$_3$-coated PAN/Fe$_2$O$_3$ nanofibers (hereafter PAN/Fe$_2$O$_3$@Fe$_2$O$_3$) did not significantly increase in average diameter. However, the nanostructures on the surface increased surface area two-fold, from 15 m$^2$/g for PAN/Fe$_2$O$_3$ to 30 m$^2$/g for PAN/Fe$_2$O$_3$@Fe$_2$O$_3$. Ultimately, this core-shell, polymer-oxide composite represents a cohesive material that combines the benefits of material strength and external reactive surface area ideal for reactive filtration applications for water treatment.

Multi-Target Metal Adsorption with PAN/Fe$_2$O$_3$@Fe$_2$O$_3$.

All adsorption isotherms (like those in FIG. 2) exhibited clear plateaus, consistent with a maximum uptake equivalent to one monolayer. Accordingly, all data from sorption isotherms were fit with the Langmuir adsorption model (Equation 1):

$$q = \frac{K_L q_{max} C_e}{1 + K_L C_e} \qquad \text{(Equation 1)}$$

where q is the mass of contaminant adsorbed per mass or specific surface area of adsorbent (mg/g or mg/m$^2$), KL is the Langmuir coefficient, $q_{max}$ is the amount of adsorption at one monolayer, and $C_e$ is the equilibrium concentration of the contaminant in solution. In this study, maximum capacities ($q_{max}$) were used to compare performance.

Figure 5:
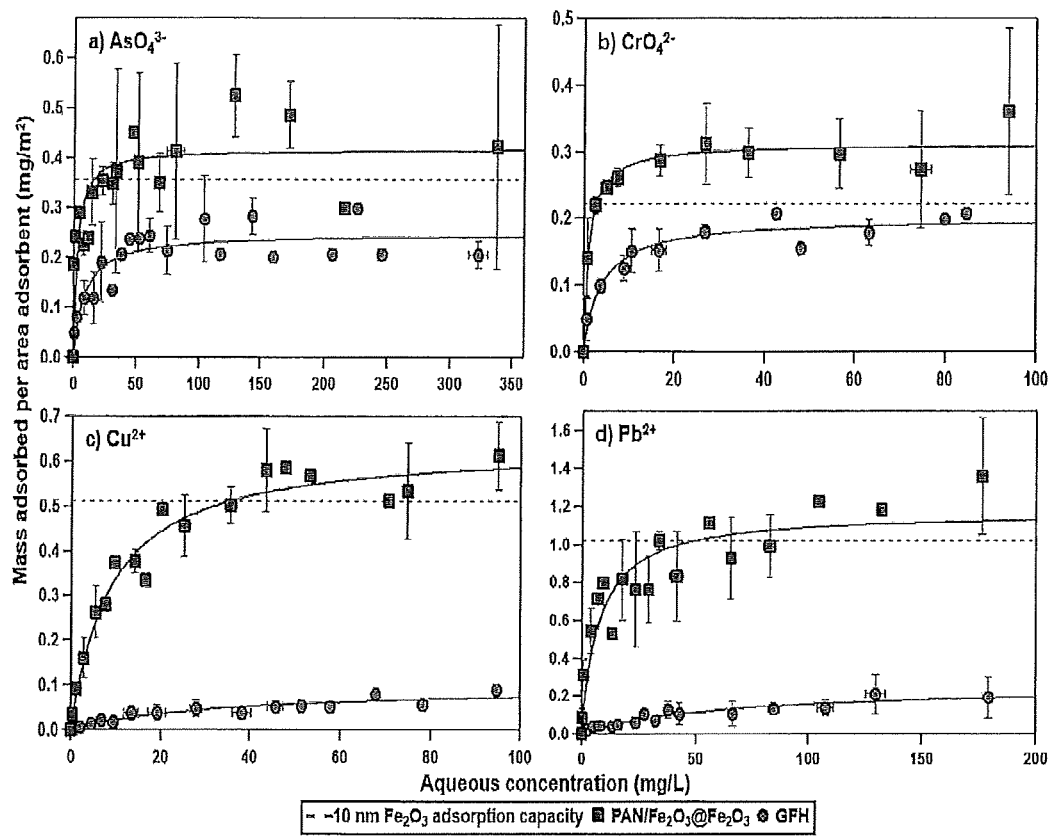
FIG. 5 shows adsorption isotherms for PAN/$Fe_2O_3$@$Fe_2O_3$ in red and GFH in blue for a) $AsO_4^{3-}$, b) $CrO_4^{2-}$, c) $Cu^{2+}$, and d) $Pb^{2+}$. Experiments were conducted in pH 6 10 mM MES buffer. Isotherms are given in terms of mass adsorbed per surface area of adsorbent, and lines are Langmuir model fits.

Adsorption isotherms for $AsO_4^{3-}$, $CrO_4^{2-}$, $Cu^{2+}$, and $Pb^{2+}$ are shown in FIG. 5 for PAN/$Fe_2O_3$@$Fe_2O_3$, GFH@ and a dispersion of 10 nm α-$Fe_2O_3$ nanoparticles. Across all metals considered, notable outcomes from adsorption isotherms are that PAN/$Fe_2O_3$@$Fe_2O_3$ (i) outperforms commercial GFH@ on the basis of available surface area and (ii) performs equivalently to dispersions of 10 nm $Fe_2O_3$ nanoparticles. Generally, at pH 6, PAN/$Fe_2O_3$@$Fe_2O_3$ and 10 nm $Fe_2O_3$ nanoparticles have greater adsorption capacities for cationic species ($Cu^{2+}$ and $Pb^{2+}$), while GFH@ generally adsorbs anionic species ($AsO_4^{3-}$ and $CrO_4^{2-}$) better than cations (Table 1). This is consistent with all $Fe_2O_3$ surfaces possessing lower points of zero charge (pzc) than GFH@, such that at pH 6 both PAN/$Fe_2O_3$@$Fe_2O_3$ and 10 nm $Fe_2O_3$ nanoparticles have a larger number of negatively charged surface sites (e.g., —Fe—O—) for attracting and binding cations. Indeed, it was anticipated that GFH@, which consists of poorly crystalline akaganeite (β—FeOOH), would adsorb anions better than cations at near-neutral pH, as it is a material widely marketed for As removal. In comparison with literature, the hematite materials followed adsorption capacity trends known for $AsO_4^{3-}$, $CrO_4^{3-}$, $Cu^{2+}$, and $Pb^{2+}$, consistent with a shared binding mechanism (i.e., surface complexation) for $Fe_2O_3$ nanoparticles and our synthetic PAN/$Fe_2O_3$@$Fe_2O_3$.

TABLE 1

Langmuir isotherm adsorption capacities for $AsO_4^{3-}$, $CrO_4^{2-}$, $Cu^{2+}$, and $Pb^{2+}$ for PAN/$Fe_2O_3$ @ $Fe_2O_3$, GFH ®, and 10 nm α-$Fe_2O_3$ nanoparticles.

| Adsorbent | Langmuir model adsorption capacities | | | |
| --- | --- | --- | --- | --- |
| | $AsO_4^{3-}$ $q_{max}$ (mg/m²) | $CrO_4^{2-}$ $q_{max}$ (mg/m²) | $Cu^{2+}$ $q_{max}$ (mg/m²) | $Pb^{2+}$ $q_{max}$ (mg/m²) |
| PAN/$Fe_2O_3$ @ $Fe_2O_3$ | 0.4 +/− 0.0 | 0.3 +/− 0.0 | 0.6 +/− 0.0 | 1.2 +/− 0.1 |
| GFH ® | 0.2 +/− 0.0 | 0.2 +/− 0.0 | 0.1 +/− 0.0 | 0.3 +/− 0.0 |
| 10 nm α-$Fe_2O_3$ | 0.4 +/− 0.0 | 0.2 +/− 0.1 | 0.5 +/− 0.1 | 1.0 +/− 0.2 |

Thus, the composite nanofibers herein appear to behave identically to their nanoparticle analogs. This is especially promising for predicting performance and application targets for Fe2O3 nanofiber networks from the plethora of existing studies on nanoparticulate Fe2O3 sorbents.

Figure 6:
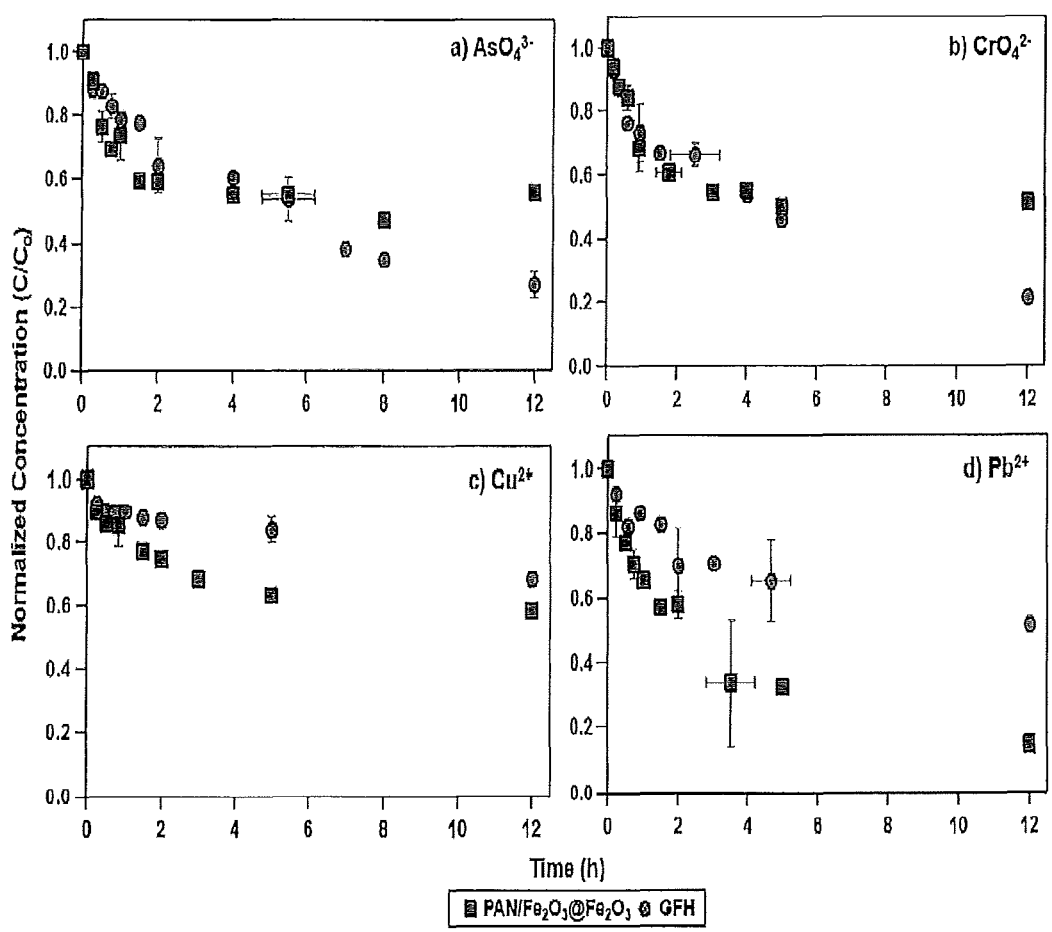
FIG. 6 shows adsorption kinetics for PAN/$Fe_2O_3$@$Fe_2O_3$ in red and GFH in blue for a) 7.4 mg/L $AsO_4^{3-}$, b) 6.7 mg/L $CrO_4^{2-}$, c) 0.6 mg/L $Cu^{2+}$, and d) 3.0 mg/L $Pb^{2+}$. Experiments were conducted in pH 6 10 mM MES buffer. Kinetics are given in terms of mass adsorbed per surface area of adsorbent.

With a greater amount of external surface area, rates of metal adsorption on PAN/$Fe_2O_3$@$Fe_2O_3$ proved either comparable or more rapid than those observed for GFH@. For anionic $AsO_4^{3-}$ and $CrO_4^{2-}$, equilibrium with PAN/$Fe_2O_3$@$Fe_2O_3$ was reached after ~2 h, whereas uptake of ~50% of cationic $Cu^{2+}$ and $Pb^{2+}$ was achieved by 2 h (FIG. 6). In comparison, GFH@ reached approximately 50% uptake of all metals in 2 to 4 hours, with over 12 hours required to reach equilibrium concentrations. The rate of adsorption is an important consideration for nanofiber-based treatment applications, particularly when attempting to implement this technology via a reactive filtration platform. Because a simple dead-end (i.e., flow perpendicular to the membrane) filtration set-up will have very short contact times between the adsorption material and the water to be treated, rapid sorption kinetics are needed to promote pollutant removal. The relative fast rates of sorption of PAN/$Fe_2O_3$@$Fe_2O_3$ show promise for treating water contaminated with metals in flow-through filtration without requiring a deeper bed of material as with GFH@ or high pressure filtration as with a packed layer of $Fe_2O_3$ nanoparticles.

Figure 7:
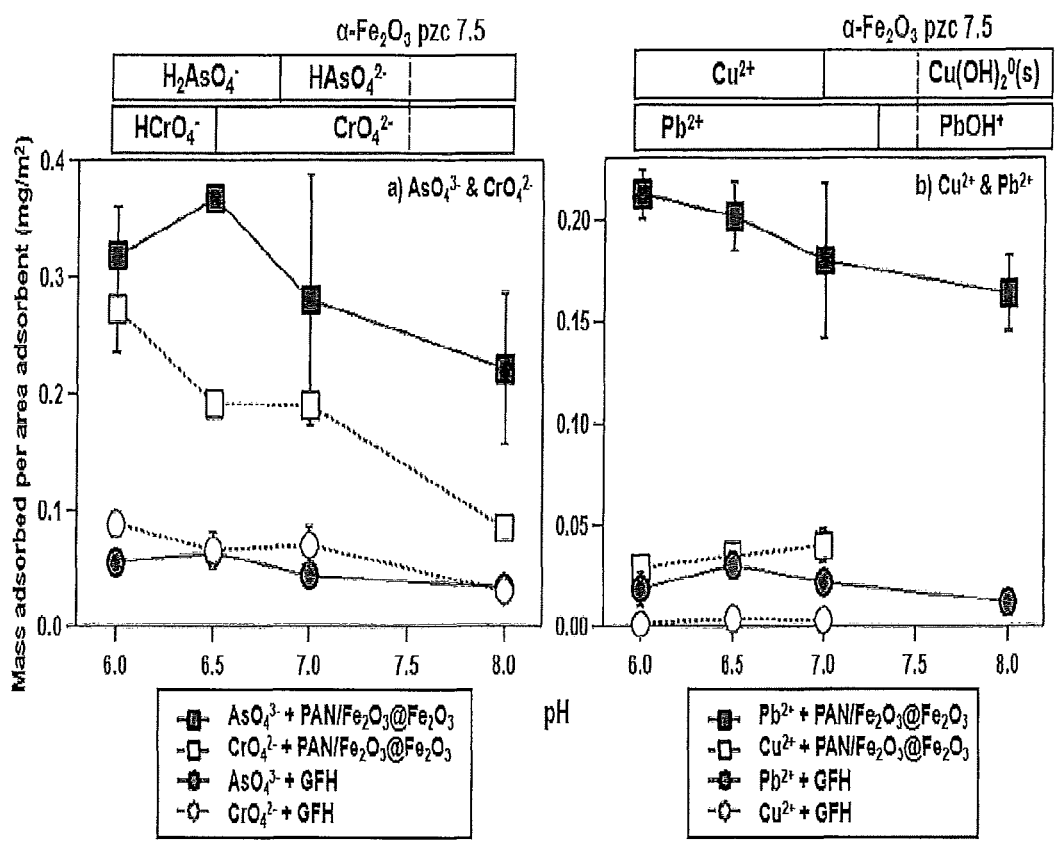
FIG. 7 shows adsorption pH edges for PAN/$Fe_2O_3$@$Fe_2O_3$ in red and GFH in blue for a) 7.4 mg/L $AsO_4^{3-}$, 6.7 mg/L $CrO_4^{2-}$ and b) 0.6 mg/L $Cu^2$, 3.0 mg/L $Pb^{2+}$. Experiments were conducted in 10 mM MES buffer for pH 6 and 6.5 and 10 mM HEPES buffer for pH 7 and 8. pH edges are given in terms of mass adsorbed per surface area of adsorbent. Speciation of metals is given above each plot, delineated with pKa and complexation constant values. A typical pzc value for $\alpha$-$Fe_2O_3$, 7.5, is provided in green.

Finally, the superior performance of PAN/$Fe_2O_3$@$Fe_2O_3$ is maintained across the pH range of natural waters (pH 6.0 to 8.0), over which it adsorbs more than three-fold higher levels of anions and four-fold higher levels of cations than GFH@, with adsorption generally decreasing with increasing pH for all metals except $Cu^{2+}$ (FIG. 7). These trends are mostly consistent with electrostatics being the primary driver for metal uptake. For example, the extent of adsorption of $AsO_4^{3-}$ is expected to decrease with increasing pH due to $H_2AsO^{4-}$ deprotonating to $HCrO_4^{2-}$ at its acid dissociation constant (pKa), pH 6.8, and the surface of hematite becoming more negative at higher pH values (and thus repelling anions). Similarly, the decrease in $CrO_4^{2-}$ adsorption with increasing pH can be attributed to $HCrO_4^{2-}$ deprotonation to $CrO_4^{2-}$ at its pKa, pH 6.5, while the hematite surface is also becoming more negatively charged.

For cations, at pH values up through 7, $Cu^{2+}$ dominates Cu speciation, but the hematite surface becomes progressively more negative in charge and thus more favorable for cation adsorption. The dominant species of Pb shifts from $Pb^{2+}$ to less positive complexes that are less attracted to a negative surface, including $PbOH^+$ at pH 7.2 and $PbCO_3(aq)$ (from carbonate available from the atmosphere).

These pH-dependent trends for metal sorption on PAN/$Fe_2O_3$@$Fe_2O_3$ are consistent with those previously observed for $AsO_4^{3-}$, $CrO_4^{2-}$, and $Cu^{2+}$ on more traditional iron oxide sorbent media. Notably, the trend for $Pb^{2+}$ seen with PAN/$Fe_2O_3$@$Fe_2O_3$ is different than previously established trends, as an increase in adsorption is often reported with increasing pH. Presumably, the surface charge on PAN/$Fe_2O_3$@$Fe_2O_3$ may be different from that of unsupported hematite, leading to a more pronounced difference in uptake of lead when speciation becomes dominated by near-neutral soluble forms. Nevertheless, the activity of PAN/$Fe_2O_3$@$Fe_2O_3$ toward common metal pollutants, both cationic and anionic, remains relatively high across a range of environmentally relevant pH values, particularly those likely encountered in water treatment.

This example demonstrates the promise of a cohesive platform for metal sequestration in water treatment applications—PAN/$Fe_2O_3$@$Fe_2O_3$. The electrospinning process allowed the facile synthesis of a flexible, stable nanofiber network, while the hydrothermal treatment achieved a coating of $Fe_2O_3$ nanostructures increasing the reactive iron oxide surface area available to adsorb metals from solution. Hydrothermal treatment parameters could be varied to change the thickness of the $Fe_2O_3$ coating on the nanofibers. The optimal PAN/$Fe_2O_3$@$Fe_2O_3$ adsorbed significant amounts of $AsO_4^{3-}$, $CrO_4^{2-}$, $Cu^{2+}$, and $Pb^{2+}$ across a range of initial concentrations and pH values. Adsorption capacities were comparable to those of 10 nm $Fe_2O_3$ nanoparticles, so a material has been created that likely utilizes the studied mechanisms of uptake of nanoparticulate hematite while bound in a cohesive platform. The kinetics for the material demonstrate that the majority of adsorption occurs in the first two hours from utilizing external surface area. This result in particular shows that the PAN/$Fe_2O_3$@$Fe_2O_3$ nanofiber mat, intended to be used as a point-of-use filtration membrane (among other applications), employs rapid kinetics required in flow-through filtration as compared to GFH@. Simultaneously, the PAN/$Fe_2O_3$@$Fe_2O_3$ nanofiber network—a flexible sheet of nanofibers, even after hydrothermal treatment—is a robust candidate as a filtration technology. The small footprint of this membrane as a filter would allow it to be deployed in point-of-use scenarios (e.g., by individual groundwater well users in rural areas) where larger technologies (e.g., a packed bed of GFH) cannot be easily utilized.

Example 2: PAN Nanofibers Containing CTAB and Fh

PAN nanofibers were prepared containing cetyltrimethylammonium bromide (CTAB) and/or ferrihydrite (Fh) nanoparticles (materials are hereafter referred to as $Fh_x$-$CTAB_y$, where x and y indicate weight % of Fh and CTAB, respectively, in the precursor solution).

Figure 8:
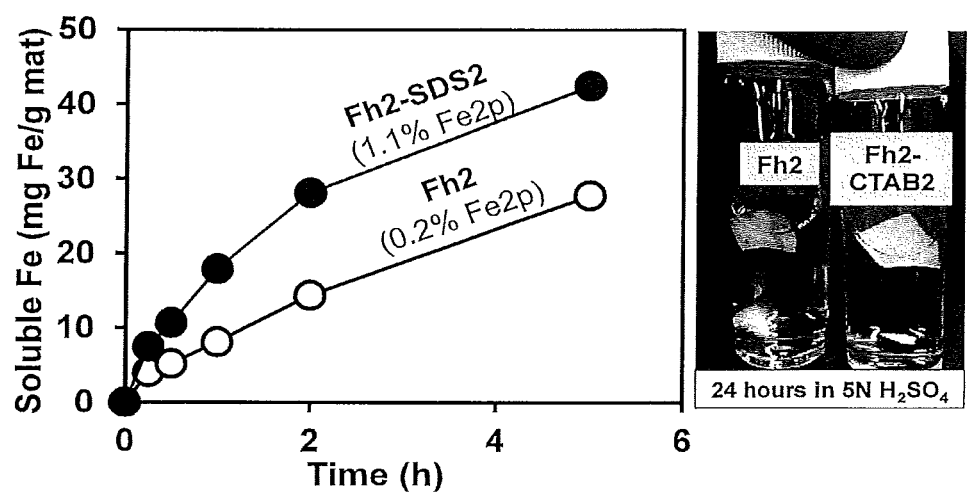
FIG. 8 shows (a) Dissolution of Fh2 composites (w/and w/o SDS) in 0.1 N $H_2SO_4$. XPS Fe concentrations are provided. (b) Image of Fh2 composites (w/and w/o CTAB) after 24 h in 5 N $H_2SO_4$.

PAN nanofibers electrospun from solutions with CTAB and Fh exhibited surface enrichment of both cationic quaternary ammonium functionalities and Fh nanoparticles. X-ray photoelectron spectroscopy (XPS) indicated a 2-fold increase in surface Fe concentration for Fh composites containing CTAB. This surface Fe excess increases to 5-fold when anionic sodium dodecyl sulfonate (SDS; 2 weight %) is used (FIG. 8, panel a). Additional evidence for surface Fh accumulation is provided by Fe dissolution rates during mat acid digestion. Over 2 h in 0.1 N $H_2SO_4$, $Fh_2$-$SDS_2$ composites exhibited a 2-fold greater Fe dissolution rate than non-SDS-containing mats. After 24 h in 5 N $H_2SO_4$, $Fh_2$ composites without CTAB retained their reddish-brown tint distinctive of iron oxides, suggesting PAN effectively limits Fh access to solution. In contrast, the corresponding $Fh_2$-$CTAB_2$ composite was completely white (the color of PAN) after 24 h (FIG. 8, panel b), implying near-complete Fh dissolution and consistent with surface-segregating CTAB improving the surface accessibility of Fh.

Figure 9:
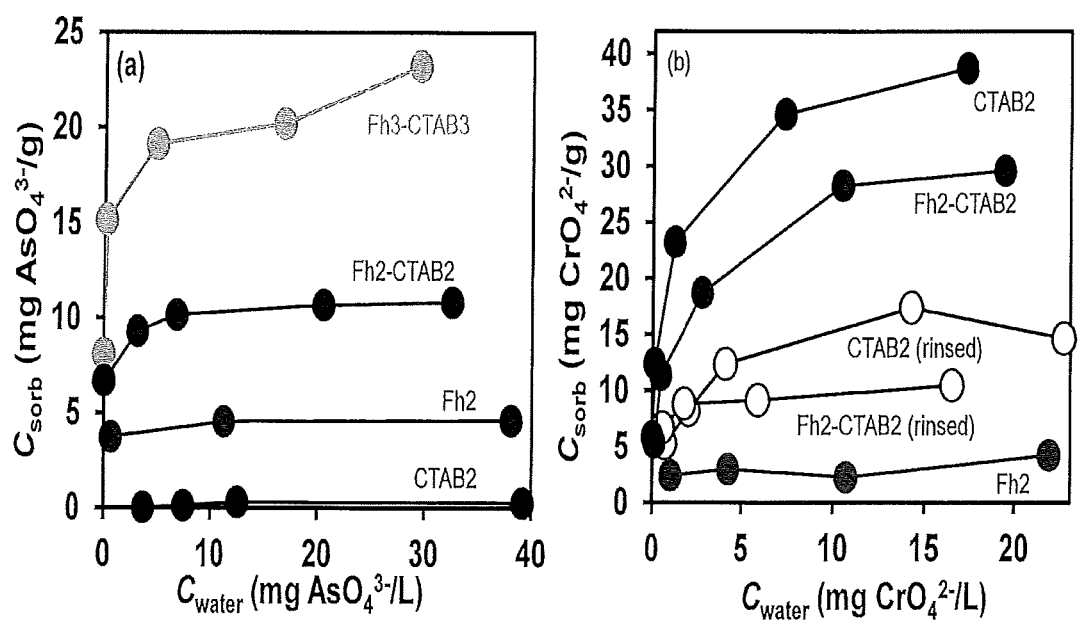
FIG. 9 shows isotherms for (a) $AsO_4^{3-}$ and (b) $CrO_4^{2-}$ on various CTAB-functionalized-ferrihydrite PAN composites (pH 7, 0.5 g/L composite, t=24 h).

Example 3: Surface-Functionalized Polymer-Metal Oxide Composites as Materials for Oxyanion Uptake Sorption studies revealed that surface-enriched quaternary ammonium groups and Fh nanoparticles are effective sorbents toward oxyanion pollutants including arsenate ($AsO_4^{3-}$) (FIG. 9, panel a) and chromate ($CrO_4^{2-}$) (FIG. 9, panel b). PAN nanofibers with only CTAB ($CTAB_2$) exhibit no $AsO_4^{3-}$ uptake, while PAN with only Fh nanoparticles (Fh2) produces relatively modest uptake, presumably via the limited Fh available on the composite surface. In contrast, composites with both CTAB and Fh produced $AsO_4^{3-}$ uptake that was both super-synergistic (i.e., more than additive for $Fh_2$-$CTAB_2$) and tunable with increasing Fh and CTAB (greater uptake for $Fh_3$-$CTAB_3$). We attribute this behavior to the ability of surface-segregating CTAB to also promote surface access to Fh nanoparticles (consistent with XPS and Fe dissolution studies).

For $CrO_4^{2-}$, while Fh2 composites exhibited little capacity, $CTAB_2$ mats achieved high levels of removal. Incidentally, the mixed $Fh_2$-$CTAB_2$ composite exhibited slightly lower sorption relative to $CTAB_2$, consistent with quaternary ammonium sites being primarily responsible for $CrO_4^{2-}$ binding. Thus, these CTAB-integrated materials behave as anion exchange resins (indeed, Br release is measurable during $CrO_4^{2-}$ uptake). Notably, no significant loss in $AsO_4^{3-}$ capacity was observed after washing of $Fh_x$-CTAB, composites, consistent with CTAB not being directly responsible for $AsO_4^{3-}$ uptake.

Example 4: Uptake of Nitrate, Nitrite, and Phosphate Species

Figure 10:
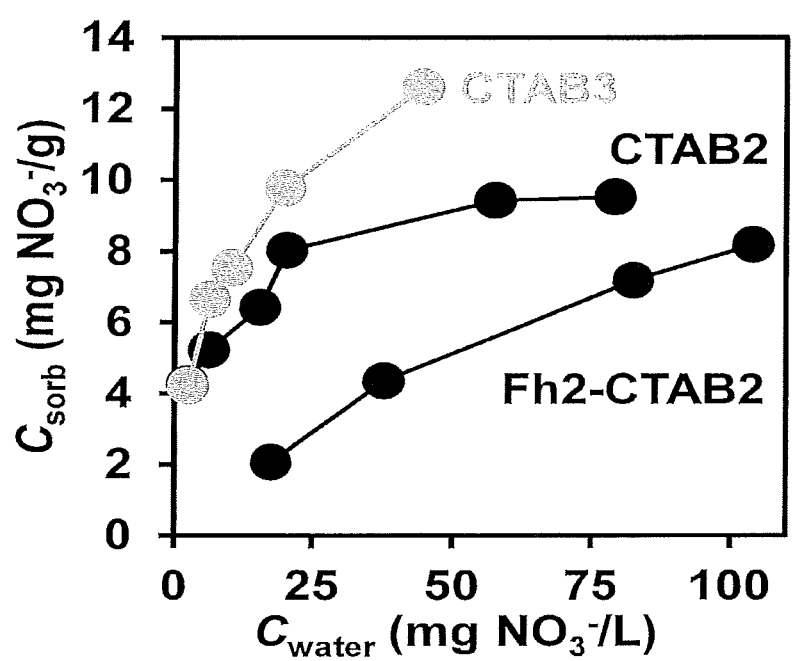
FIG. 10 shows isotherms for $NO_3^-$ on CTAB-functionalized-ferrihydrite PAN composites (pH 7, 0.5 g/L composite, t=24 h).
Figure 11:
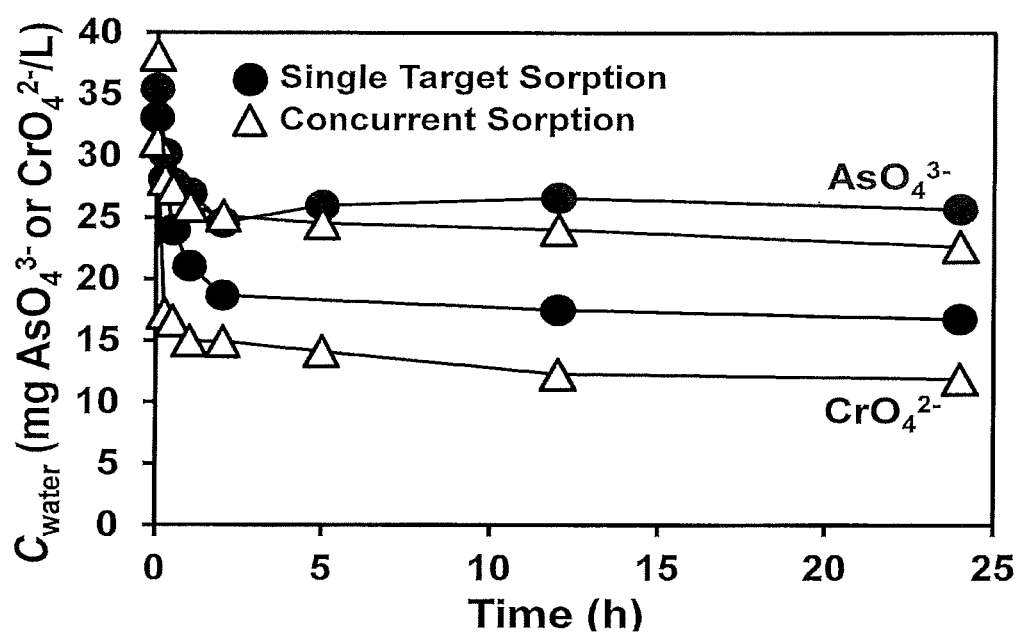
FIG. 11 shows kinetics for $AsO_4^{3-}$ and $CrO_4^{2-}$ uptake on $Fh_3$-$CTAB_3$ for systems where species were studied in isolation and concurrently as mixtures (pH 7, 0.5 g/L composite).

Uptake studies of environmentally relevant N (nitrate and nitrite) and P (phosphate) species were carried. FIG. 10 illustrates that Fh and CTAB composites exhibit appreciable uptake for nitrate ($NO_3^-$), with higher CTAB concentrations yielding better performance. As with $CrO_4^{2-}$, these data support the role of quaternary ammonium groups as strong base anion exchange sites primarily responsible for $NO_3^-$ binding. Further, we anticipate this mode of $NO_3^-$ binding will be complemented by the preferential sorption of $PO_4^{3-}$ onto iron oxides. Thus, as we have observed for simultaneous $AsO_4^{3-}$ and $CrO_4^{2-}$ uptake (FIG. 11), these materials should be able to simultaneously and non-competitively bind environmentally relevant N and P species.

It will be apparent to those skilled in the art that various modifications and variations can be made in the present invention and specific examples provided herein without departing from the spirit or scope of the invention. Thus, it is intended that the present invention cover the modifications and variations of this invention that come within the scope of any claims and their equivalents.

When ranges are used herein for physical properties, such as molecular weight, or chemical properties, such as chemical formulae, all combinations, and subcombinations of ranges specific embodiments therein are intended to be included.

The disclosures of each patent, patent application and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A composite, comprising,
polymeric nanofibers;
metal oxide nanoparticles;
wherein at least a portion of said metal oxide nanoparticles are embedded within said polymeric nanofibers and at least another portion of said metal oxide nanoparticles embedded on said polymeric nanofibers;
optionally, surface-segregating surfactant; and
optionally, carbon nanotubes, graphene, or a combination thereof; wherein said composite has a pore volume, as determined by $N_2$-BET analysis, of at least about 0.1 cm$^3$/g.

2. A nonwoven mat, comprising:
the composite of claim 1.

3. A point-of-use filtration device, comprising:
the nonwoven mat of claim 2.

4. A modular filter system, comprising:
a first module comprising the nonwoven mat of claim 2;
a second module capable of chemical oxidation, disinfection, or a combination thereof; and
at least one further module capable of sorbing dissolved organic matter, oxidation byproducts, or a combination thereof.

5. The composite of claim 1, wherein the surface-segregating surfactant is present at a level of about 0.1% by weight to about 3% by weight, based on the total weight of the composite.

6. The composite of claim 1, wherein the surface-segregating surfactant is sodium dodecyl sulfonate (SDS), cetyltrimethylammonium (cetrimonium) bromide (CTAB), tetra-n-butylammonium bromide (TBAB), cetyltrimethylammonium chloride (CTAC), or a mixture thereof.

7. A composite, comprising,
polymeric nanofibers;
metal oxide nanoparticles;
wherein at least a portion of said metal oxide nanoparticles are embedded within said polymeric nanofibers and at least another portion of said metal oxide nanoparticles embedded on said polymeric nanofibers;
optionally, surface-segregating surfactant; and
optionally, carbon nanotubes, graphene, or a combination thereof; wherein said composite has a Young's Modulus, as measured by atomic force microscopy indentation, of less than about 100 MPa.

8. A nonwoven mat, comprising:
the composite of claim 7.

9. A point-of-use filtration device, comprising:
the nonwoven mat of claim 8.

10. A modular filter system, comprising:
a first module comprising the nonwoven mat of claim 8;
a second module capable of chemical oxidation, disinfection, or a combination thereof; and
at least one further module capable of sorbing dissolved organic matter, oxidation byproducts, or a combination thereof.

* * * * *